(12) United States Patent
McClung et al.

(10) Patent No.: US 9,020,879 B2
(45) Date of Patent: Apr. 28, 2015

(54) INTELLIGENT DATA AGENT FOR A KNOWLEDGE MANAGEMENT SYSTEM

(71) Applicant: Bank of America Corporation, Charlotte, NC (US)

(72) Inventors: Susan McClung, Charlotte, NC (US); Michael K. Hofmeister, Lake Wylie, SC (US)

(73) Assignee: Bank of America Corporation, Charlotte, NC (US)

( * ) Notice: Subject to any disclaimer, the term of this patent is extended or adjusted under 35 U.S.C. 154(b) by 240 days.

(21) Appl. No.: 13/656,927

(22) Filed: Oct. 22, 2012

(65) Prior Publication Data

US 2014/0114902 A1    Apr. 24, 2014

(51) Int. Cl.
*G06Q 10/06* (2012.01)
*G06N 5/02* (2006.01)
*G06F 17/30* (2006.01)

(52) U.S. Cl.
CPC ............... *G06N 5/025* (2013.01); *G06Q 10/06* (2013.01); *G06F 17/30734* (2013.01)

(58) Field of Classification Search
USPC .............................................. 706/47, 50, 59
See application file for complete search history.

(56) References Cited

U.S. PATENT DOCUMENTS

| 6,424,973 | B1 | 7/2002 | Baclawski |
|---|---|---|---|
| 2004/0230572 | A1 | 11/2004 | Omoigui |
| 2006/0122976 | A1 | 6/2006 | Baluja et al. |
| 2007/0174270 | A1 | 7/2007 | Goodwin et al. |
| 2009/0112835 | A1 | 4/2009 | Elder |
| 2009/0228445 | A1* | 9/2009 | Gangal ............................ 707/3 |
| 2011/0004588 | A1 | 1/2011 | Leitersdorf et al. |
| 2012/0030188 | A1 | 2/2012 | Gutlapalli et al. |
| 2012/0191716 | A1 | 7/2012 | Omoigui |
| 2013/0054589 | A1 | 2/2013 | Cheslow |
| 2013/0066876 | A1 | 3/2013 | Raskino et al. |
| 2014/0040275 | A1 | 2/2014 | Dang et al. |

OTHER PUBLICATIONS

Susan McClung et al.; USPTO Non Final Office Action, U.S. Appl. No. 13/657,223, filed Oct. 22, 2012, Mar. 25, 2014.
Susan McClung et al.; Response Pursuant to 37 C.F.R. § 1.111; U.S. Appl. No. 13/657,223, Jun. 24, 2014.
U.S. Appl. No. 13/656,979, filed Oct. 22, 2012, Susan McClung.
U.S. Appl. No. 13/657,045, filed Oct. 22, 2012, Susan McClung.
U.S. Appl. No. 13/657,111, filed Oct. 22, 2012, Susan McClung.
U.S. Appl. No. 13/657,223, filed Oct. 22, 2012, Susan McClung.

(Continued)

*Primary Examiner* — Jeffrey Gaffin
(74) *Attorney, Agent, or Firm* — Michael A. Springs

(57) ABSTRACT

A system includes a memory operable to store one or more classification rules. The system also includes a processor communicatively coupled to the memory. The processor is operable to retrieve one or more data elements from a data source. The processor is further operable to identify a structured data element among the one or more data elements. The processor is further operable to parse the structured data element using one or more filter processes to produce a plurality of tokens. The processor is further operable to classify the plurality of tokens based at least in part on the one or more classification rules and an ontology, which includes a plurality of concepts and a plurality of relationships between the concepts. The processor is further operable to generate a knowledge assertion, which includes the plurality of classified tokens and one or more relationships between the classified tokens.

18 Claims, 12 Drawing Sheets

(56) References Cited

OTHER PUBLICATIONS

Susan McClung et al.; USPTO Non Final Office Action, U.S. Appl. No. 13/657,045, filed Oct. 22, 2012, Aug. 28, 2014.
Susan McClung et al.; USPTO Non Final Office Action, U.S. Appl. No. 13/656,979, filed Oct. 22, 2012, Sep. 10, 2014.
Guo, et al., "Automatic feature extraction using genetic programming: An application to epileptic EEG classification", Expert Systems with Applications, vol. 38, Issue 8, Aug. 2011, pp. 10425-10436.
Susan McClung et al.; Response to Non-final Office Action dtd Nov. 24, 2014; U.S. Appl. No. 13/657,045.
USPTO Final Office Action dtd Oct. 15, 2014; U.S. Appl. No. 13/657,223.
Susan McClung et al.; Response Non Final Office Action, U.S. Appl. No. 13/656,979, Dec. 10, 2014.

\* cited by examiner

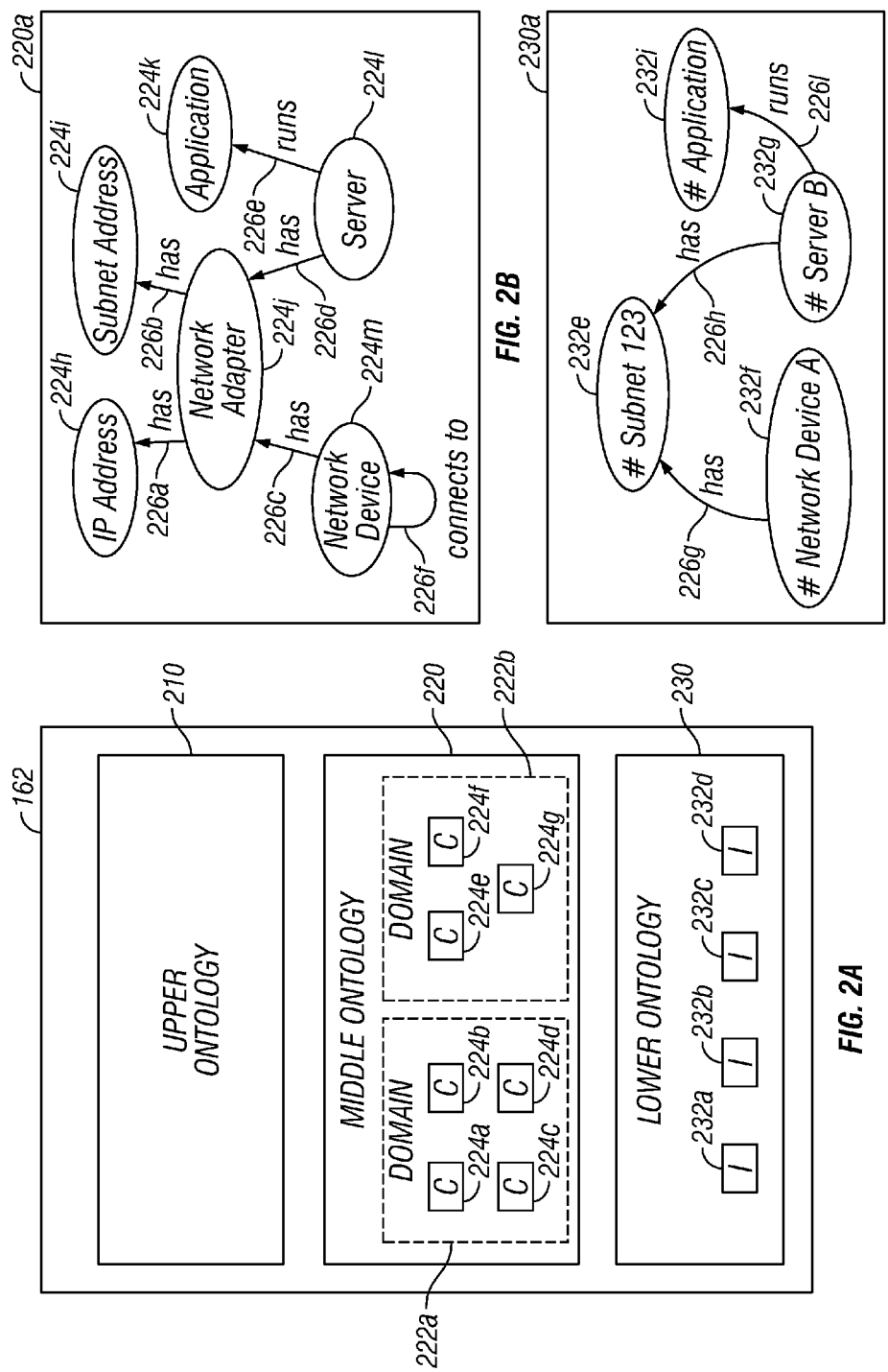

INTELLIGENT DATA AGENT FOR A KNOWLEDGE MANAGEMENT SYSTEM

TECHNICAL FIELD OF THE INVENTION

The present disclosure relates generally to knowledge management and more specifically to an intelligent data agent for a knowledge management system.

BACKGROUND OF THE INVENTION

Vast amounts of information and data may be electronically accessible, such as via a computer network. However, systems supporting knowledge management have proven inadequate in various respects.

SUMMARY OF THE DISCLOSURE

In certain embodiments, a system includes a memory operable to store one or more classification rules. The system also includes a processor communicatively coupled to the memory. The processor is operable to retrieve one or more data elements from a data source. The processor is further operable to identify a structured data element among the one or more data elements. The processor is further operable to parse the structured data element using one or more filter processes to produce a plurality of tokens. The processor is further operable to classify the plurality of tokens based at least in part on the one or more classification rules and an ontology. The ontology includes a plurality of concepts and a plurality of relationships between the concepts. The processor is further operable to generate a knowledge assertion. The knowledge assertion includes the plurality of classified tokens and one or more relationships between the classified tokens.

In other embodiments, a method includes retrieving one or more data elements from a data source. The method also includes identifying a structured data element among the one or more data elements. The method also includes parsing the structured data element using one or more filter processes to produce a plurality of tokens. The method also includes classifying, by a processor, the plurality of tokens based at least in part on one or more classification rules and an ontology. The ontology includes a plurality of concepts and a plurality of relationships between the concepts. The method also includes generating a knowledge assertion, which includes the plurality of classified tokens and one or more relationships between the classified tokens.

In further embodiments, one or more non-transitory computer readable storage media embody logic. The logic is operable when executed by one or more processors to retrieve one or more data elements from a data source. The logic is further operable to identify a structured data element among the one or more data elements. The logic is further operable to parse the structured data element using one or more filter processes to produce a plurality of tokens. The logic is further operable to classify the plurality of tokens based at least in part on one or more classification rules and an ontology. The ontology includes a plurality of concepts and a plurality of relationships between the concepts. The logic is further operable to generate a knowledge assertion, which includes the plurality of classified tokens and one or more relationships between the classified tokens.

Particular embodiments of the present disclosure may provide some, none, or all of the following technical advantages. The knowledge management system may assimilate knowledge from any available data source to build a knowledge base using a dynamic ontology. The knowledge management system may allow for runtime grounding of symbols and resolution of concept relationships discovered in the various data sources to data in the ontology. This may avoid the need to encode large amounts of static data and assertions into the ontology that are constantly undergoing change. Newly discovered data may be dynamically classified based on its data signature without the need to persist the data in a content database.

By evaluating data from numerous data sources and utilizing the analytical framework provided by the ontology, the knowledge management system may provide a more accurate representation of the knowledge contained in the data source by correcting for inaccuracies and/or incompleteness in any given data source. By using the analytical framework provided by the ontology, the knowledge management system may be able to reason over uncertain data and/or infer additional knowledge beyond what is found in the data sources.

By utilizing a search index in conjunction with an ontology to service search requests, the knowledge management system may enable a user to obtain the most relevant knowledge responsive to the search request. By utilizing intelligent data agents, the knowledge management system may be able to provide data that is not stored in the ontology by retrieving it upon a user request. By utilizing visualization rules, the knowledge management system may be able to provide a manageable visual representation of the knowledge and relationships modeled in the ontology, even when the ontology contains very large amounts of data and relationships.

BRIEF DESCRIPTION OF THE DRAWINGS

For a more complete understanding of the present disclosure and its advantages, reference is made to the following descriptions, taken in conjunction with the accompanying drawings in which:

FIGS. 2A-2D illustrate an example ontology, according to certain embodiments of the present disclosure;

DETAILED DESCRIPTION

Embodiments of the present disclosure and their advantages are best understood by referring to FIGS. 1 through 10 of the drawings, like numerals being used for like and corresponding parts of the various drawings.

Figure 1:
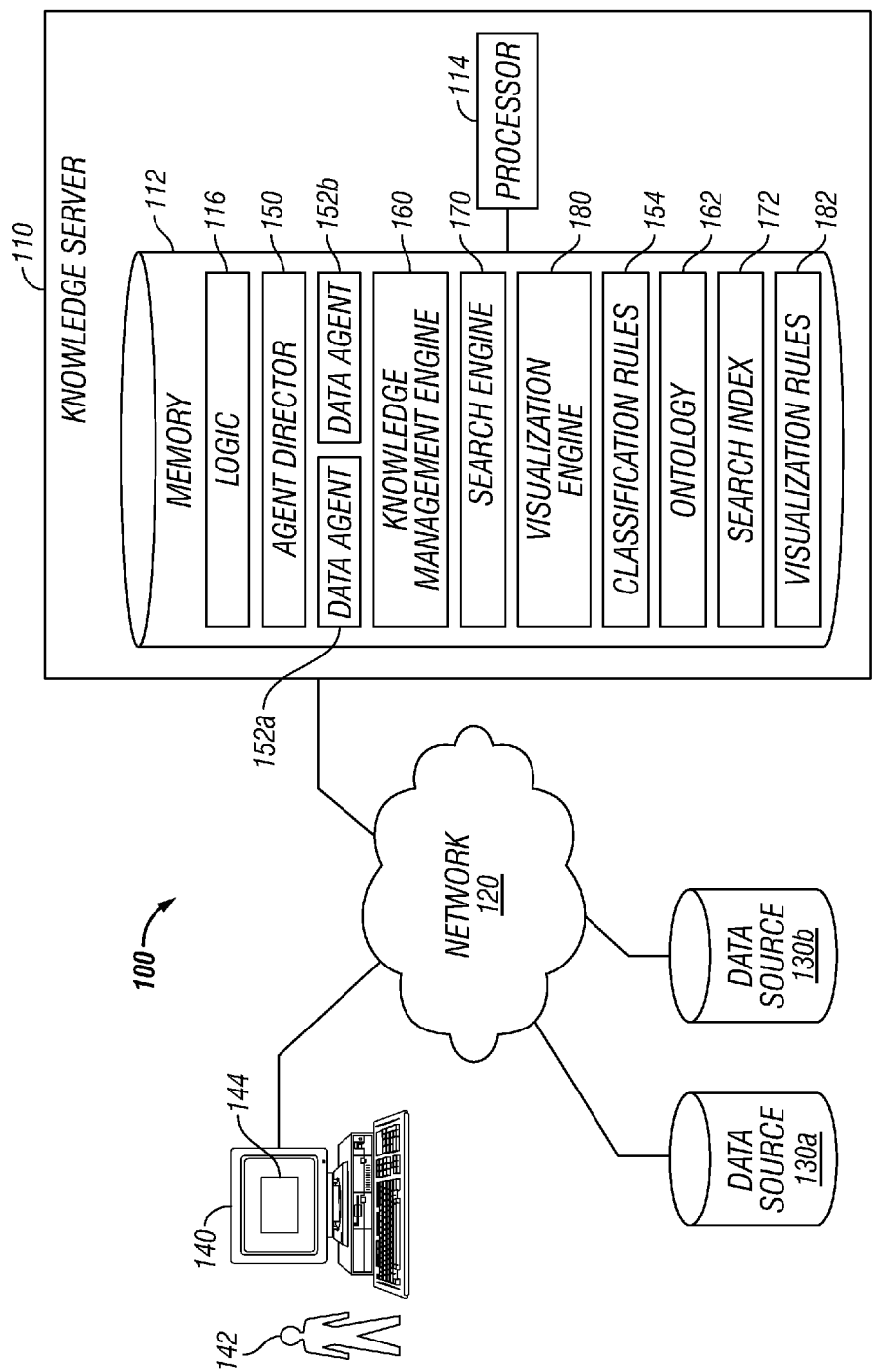
FIG. 1 illustrates an example knowledge management system, according to certain embodiments of the present disclosure.

FIG. 1 illustrates an example knowledge management system 100, according to certain embodiments of the present disclosure. In general, system 100 may represent information and data in a way that captures the underlying knowledge that the information conveys. This representation may also capture the underlying relationship between various pieces of information. A user of the system may then search this collection of underlying knowledge, which may be built up from numerous sources of information. In addition, a user of the system may view a visual representation of the relationship between the knowledge in the collection.

As one example, system 100 may access data containing information about servers and other devices connected to a network, as well as applications running on those servers, such various machine configuration files, spreadsheets, and/or databases maintained on the network. System 100 may use the data to build a knowledge base that classifies each network server or device and shows how each device connects to other devices on the network. The knowledge base may also show properties of each device, such as the running operating system, the IP address, which applications the device is responsible for hosting, and other such information. Thus, the knowledge base may provide an overall picture of the network architecture and/or topology for one or more data centers, as well as the details and properties of each component and its relationships to other components. System 100 may allow a user to view a visual representation of the logical network infrastructure for one or more data centers.

In particular, system 100 may include one or more knowledge servers 110, one or more data sources 130, one or more clients 140, and one or more users 142. Knowledge server 110, data sources 130, and client 140 may be communicatively coupled by a network 120. Knowledge server 110 is generally operable to gather and manage knowledge derived from data sources 130, as described below.

In general, data source 130 may be any collection of structured and/or unstructured data For example, a data source 130 may be a text file, a webpage, a database, a spreadsheet, a document, an inventory flat file, a data warehouse, a machine configuration file, or any other suitable source of information. Although system 100 illustrates data sources 130a-b, it should be understood that system 100 may include any number and combination of data sources 130. Data source 130 may be located in any suitable location that is accessible via network 120.

Network 120 may refer to any interconnecting system that facilitates wireless and/or wireline communication. Network 120 may communicate, for example, IP packets, Frame Relay frames, Asynchronous Transfer Mode (ATM) cells, voice, video, data, and other suitable information between network addresses. Network 120 may include all of a portion of a public switched telephone network (PSTN), a public or private data network, a personal area network (PANs), a local area network (LAN), a wireless LAN (WLAN), a virtual private network (VPN), a radio access network (RAN), a metropolitan area network (MAN), a wide area network (WAN), a mobile networks (e.g., using WiMax (802.16), WiFi (802.11), 3G, or any other suitable wireless technologies in any suitable combination), an enterprise intranet, a local, regional, or global communication or computer network such as the Internet, and/or any other suitable communication link, including combinations of the foregoing.

Client 140 may refer to any device that enables user 142 to interact with knowledge server 110. In some embodiments, client 140 may include a computer, workstation, telephone, Internet browser, electronic notebook, Personal Digital Assistant (PDA), pager, smart phone, tablet, laptop, or any other suitable device (wireless, wireline, or otherwise), component, or element capable of receiving, processing, storing, and/or communicating information with other components of system 100. Client 140 may also comprise any suitable user interface such as a display, microphone, keyboard, or any other appropriate terminal equipment usable by a user 142. It will be understood that system 100 may comprise any number and combination of clients 140. Client 140 may be utilized by user 142 to interact with knowledge server 110 in order to submit search requests and/or visualization requests, as described below.

In some embodiments, client 140 may include a graphical user interface (GUI) 144. GUI 144 is generally operable to tailor and filter data presented to user 142. GUI 144 may provide user 142 with an efficient and user-friendly presentation of information. GUI 144 may additionally provide user 142 with an efficient and user-friendly way of inputting and submitting search requests and/or visualization requests to knowledge server 110. GUI 144 may comprise a plurality of displays having interactive fields, pull-down lists, and buttons operated by user 142. GUI 144 may include multiple levels of abstraction including groupings and boundaries. It should be understood that the term graphical user interface 144 may be used in the singular or in the plural to describe one or more graphical user interfaces 144 and each of the displays of a particular graphical user interface 144.

Knowledge server 110 may refer to any suitable combination of hardware and/or software implemented in one or more modules to process data and provide the described functions and operations. In some embodiments, the functions and operations described herein may be performed by a pool of knowledge servers 110. In some embodiments, knowledge server 110 may include, for example, a mainframe, server, host computer, workstation, web server, file server, a personal computer such as a laptop, or any other suitable device operable to process data. In some embodiments, knowledge server 110 may execute any suitable operating system such as IBM's zSeries/Operating System (z/OS), MS-DOS, PC-DOS, MAC-OS, WINDOWS, Linux, UNIX, OpenVMS, or any other appropriate operating systems, including future operating systems. In some embodiments, knowledge server 110 may be a web server running, for example, Microsoft's Internet Information Server™.

In general, knowledge server 110 gathers and manages knowledge derived from data sources 130, and responds to queries from users 142. In some embodiments, knowledge server 110 may include a processor 114 and server memory 112. Server memory 112 may refer to any suitable device capable of storing and facilitating retrieval of data and/or instructions. Examples of server memory 112 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile computer-readable memory devices that store one or more files, lists, tables, or other arrangements of information. Although FIG. 1 illustrates server memory 112 as internal to knowledge server 110, it should be understood that server memory 112 may be internal or external to knowledge server 110, depending on particular implementations. Also, server memory 112 may be separate from or integral to other memory devices to achieve any suitable arrangement of memory devices for use in system 100.

In certain embodiments, server memory 112 may be internal or external to processor 114 and may include one or more instruction caches and/or one or more data caches. Instructions in the instruction caches may be copies of instructions in memory 112, and the instruction caches may speed up retrieval of those instructions by processor 114. Data in the data caches may include any suitable combination of copies of data in server memory 112 for instructions executing at processor 114 to operate on, the results of previous instructions executed at processor 114 for access by subsequent instructions executing at processor 114, or for writing to server memory 112, and/or any other suitable data. The data caches may speed up read or write operations by processor 114.

Server memory 112 is generally operable to store classification rules 154, ontology 162, search index 172, and visualization rules 182. Classification rules 154 may be any collection of rules, standards, policies, limitations, and/or any number and combination of suitable guidelines used to parse, analyze, and/or classify data. In general, classification rules 154 may facilitate the processing of information from data sources 130 into a knowledge assertion based on ontology 162.

In general, ontology 162 may be a formal representation of knowledge. Ontology 162 may include concepts (which may be grouped into domains) and relationships between those concepts. Ontology 162 may also include instances of those concepts and the relationships between those instances. Ontology 162 may also include properties for each concept and/or instance. Ontology 162 may also include implications and rules that can be used to fill in gaps in knowledge, reconcile conflicting knowledge, and/or reason over missing or uncertain knowledge. An example embodiment of ontology 162 is described in more detail below in connection with FIGS. 2A-2D.

Search index 172 may be any data structure that facilitates a search query. Search index 172 may be structured to provide efficient search speed and/or performance. Search index 172 may contain an index of ontology 162 and/or data from data sources 130. For example, search index 172 may include each concept and/or instance in the ontology.

Visualization rules 182 may be any collection of rules, standards, policies, limitations, and/or any number and combination of suitable guidelines used to create a visual representation of all or a portion of ontology 162. In general, visualization rules 182 may facilitate the creation of a user-friendly and comprehensible visual representation. Visualization rules 182 may include style rules, layout algorithms, level of detail rules, reduction rules, and/or rewriting rules. Particular embodiments of visualization rules 182 are described in more detail below in connection with FIG. 10.

Server memory 112 is communicatively coupled to processor 114. Processor 114 is generally operable to execute logic 116 stored in server memory 112 to remotely diagnose and recover target servers 130a-b according to this disclosure. Processor 114 may include one or more microprocessors, controllers, or any other suitable computing devices or resources. Processor 114 may work, either alone or with components of system 100, to provide a portion or all of the functionality of system 100 described herein. In some embodiments, processor 114 may include, for example, any type of central processing unit (CPU).

Knowledge server 110 may also include data agents 152a-b. A data agent 152 may be any combination of software, hardware, and/or controlling logic capable of receiving and processing information. In certain embodiments, data agents 152a-b may be software stored in server memory 112. In general, a data agent 152 may parse, analyze, and/or classify data from data sources 130 so that a knowledge assertion may be generated based on the data. Although FIG. 1 illustrates two data agents 152a-b, this disclosure contemplates the use of any suitable number of data agents 152, according to particular needs.

Knowledge server 110 may also include agent director 150. Agent director 150 may be any combination of software, hardware, and/or controlling logic capable of receiving and processing information. In certain embodiments, agent director 150 may be software stored in server memory 112. In general, agent director manages data agents 152a-b. For example, agent director 150 may assign each data agent 152 to retrieve data from a particular data source 130. Agent director may also include a scheduler to determine when data agents 152 should return to a data source 130 to check for new or updated information. Agent director may also receive the results of the data gathering and classification performed by data agents 152, and may perform higher-order and/or more computational intensive classification algorithms, may reconcile conflicting data, and/or may assemble the received results for further processing (e.g., by knowledge management engine 160).

Knowledge server 110 may also include knowledge management engine 160. Knowledge management engine 160 may be any combination of software, hardware, and/or controlling logic capable of receiving and processing information. In certain embodiments, knowledge management engine 160 may be software stored in server memory 112. In general, knowledge management engine 160 may be operable to manage ontology 162. Knowledge management engine 160 may receive, validate, and refine proposed knowledge assertions generated by data agents 152 and/or agent director 150. Knowledge management engine 160 may determine whether to update ontology 162 with a proposed knowledge assertion. Knowledge management engine 160 may also receive and respond to queries from search engine 170.

Knowledge server 110 may also include search engine 170. Search engine 170 may be any combination of software, hardware, and/or controlling logic capable of receiving and processing information. In certain embodiments, search engine 170 may be software stored in server memory 112. In general, search engine 170 may be operable to process a search request relating to information stored in ontology 162. Search engine 170 may utilize search index 172, ontology 162, agent director 150, and/or data agents 152 to perform a search, depending on the particular nature of the search request. Search engine 170 may also generate search index 172 by indexing data stored in ontology 162 and/or data received from agent director 150 and/or data agents 152.

Knowledge server 110 may also include visualization engine 180. Visualization engine 180 may be any combination of software, hardware, and/or controlling logic capable of receiving and processing information. In certain embodiments, visualization engine 180 may be software stored in server memory 112. In general, visualization engine 180 may be operable to generate a visual representation of data stored in ontology 162. Visualization engine 180 may process data in ontology 162 using visualization rules 182 to create a user-friendly presentation by using appropriate style and layout and/or by limiting the amount of data displayed in a given visualization.

Turning to example operations, management system 100 may provide at least two functions: knowledge gathering and knowledge searching. Each will be described in turn.

Knowledge Gathering

Knowledge gathering may generally refer to the process of adding knowledge to ontology 162 based on information retrieved from data sources 130. Agent director 150 and/or data agents 152 may be responsible for retrieving data from data sources 130. Data agents 152 may begin this process in response to a user request, in response to a command from agent director 130, and/or according to a schedule. The schedule may determine when and/or how often information should be retrieved from a particular data source 130. The schedule may be set based on statistics gathered about the particular data source 130, such as cost to access and/or rate of decay. Cost to access may be any metric that measures an effect associated with retrieving data from the particular data source 130. For example, it may measure the time required to retrieve data from the data source 130. As another example, it may measure the performance impact that retrieving the data will have on the resource that stores and/or hosts the data source 130. In some embodiments, data sources 130 that are hosted by resources whose other functions are important and/or time or performance sensitive may be assigned higher cost to access than data sources 130 that are hosted by resources whose other functions are less important and/or less time or performance sensitive. This may allow data to be retrieved from the data sources 130 while taking into account the impact on and/or potential interruptions to other system operations. In some embodiments, cost to access may be measured empirically and/or may change over time.

Rate of decay may be any metric that reflects the frequency of content change in a data source 130. Content change may refer to new data being added to data source 130, existing data being removed from data source 130, and/or data being changed, modified, and/or reorganized within data source 130. Thus, a data source 130 whose content frequently changes may have a higher rate of decay than a data source 130 whose content rarely changes. Data agents 152 may not need to visit data sources 130 with low rates of decay as frequently as data sources 130 with higher rates of decay, as there may be a lower probability that new information will be found by doing so. Data agents 152 and/or agent director 150 may measure and/or track the rate of decay for each data source 130 from which data is retrieved. The rate of decay for a data source 130 may be stored in ontology 162, along with other data source statistics maintained for each data source 130.

Agent director 150 may determine the appropriate update schedule based on any combination and weighting of the rate of decay for each data source 130, the cost to access for each data source 130, and/or any other suitable data, rules, and/or metrics. The update schedule may specify the relative priority and/or frequency for updating each data source 130. In certain embodiments, the update schedule may take into account and/or avoid busy times for a resource hosting a particular data source 130. For example, if the resource hosts important and/or time or performance sensitive applications, busy times may be times during which data agents 152 should not access (or should not frequently access) the particular data source 130 in order to reduce the risk of degrading the performance of the hosted applications. Agent director 150 may use the update schedule to assign data retrieval tasks to data agents 152. Alternatively, data agents 152 may retrieve data based on the update schedule without direction from agent director 150.

Data agents 152 may retrieve and parse data from data sources 130. For each data element retrieved, data agents 152 may determine whether the data element should be classified according to ontology 162. If so, data agents 152 and/or agent director 150 may select an appropriate concept from ontology 162 to be the classification for the data element. A data agent 152 may do this for each related data element in a data source 130 and may then generate a knowledge assertion that includes the classified data elements, as well as the relationships between the classified data elements. Data classification and knowledge assertion generation are described in more detail below in connection with FIGS. 3-5.

Data agents 152 and/or agent director 150 may be able to detect conflicting or inconsistent data elements in data source 130 and/or in the generated knowledge assertion. Data agents 152 and/or agent director 150 may resolve those conflicts using data mitigation algorithms. Data mitigation is described in more detail below in connection with FIGS. 3-4 and 7A-7B.

For each data element retrieved, data agents 152 may also determine whether the data element should be reflected in search index 172. If so, data agents 152 and/or agent director 150 may provide appropriate information to search engine 170 so that the data element may be indexed in search index 172. This process is described in more detail below in connection with FIG. 3.

Data agents 152 and/or agent director 150 may generate and/or update data source statistics for each data source 130. Data source statistics may include any suitable metrics, heuristics, or other information regarding a particular data source 130. For example, data source statistics may indicate the reliability and/or relative correctness or completeness of data contained in a data source 130. Data source statistics may also include statistical associations and/or dependencies between various data elements with data source 130. The data source statistics may be stored in ontology 162 and/or search index 172.

Once a knowledge assertion has been generated, agent director 150 may provide the knowledge assertion to knowledge management engine 160 for evaluation. Knowledge management engine 160 may evaluate the proposed knowledge assertion against knowledge already contained in ontology 162. For example, knowledge management engine 160 may ensure that the proposed knowledge assertion is consistent with ontology 162. If a conflict or inconsistency is detected, knowledge management engine 160 may use knowledge mitigation techniques to resolve the conflict. Knowledge mitigation techniques are described in more detail below in connection with FIGS. 4 and 7A-7B.

As another example, knowledge management engine 160 may compare the proposed knowledge assertion to ontology 162 to determine if the knowledge assertion contains new, additional, or more specific knowledge than the knowledge already present in ontology 162. Based on the comparison, knowledge management engine 160 may determine that ontology 162 should be updated with all, part, or none of the knowledge contained in the proposed knowledge assertion. Updating ontology 162 is described in more detail below in connection with FIGS. 3-4.

Knowledge management engine 160 may refine the proposed knowledge assertion. For example, knowledge management engine 160 may make the knowledge assertion more specific using other knowledge in ontology 162. Knowledge management engine 160 may use implications and/or rules in ontology 16 to draw inferences from the proposed knowledge assertion. Knowledge management engine 160 may be able to reason over missing and/or uncertain data. An example of this is described below in connection with FIG. 2D.

Search engine 170 may periodically index the knowledge contained in ontology 162. Search engine 170 may generate and/or update search index 172 to facilitate searching of ontology 162. Search engine 170 may also generate and/or update search index 172 to refer to data elements from data sources 130 based on information provided by data agents 152 and/or agent director 150. Generation of search index 172 is described in more detail below in connection with FIG. 3.

Knowledge Searching

Knowledge searching may generally refer to the process of retrieving knowledge from ontology 162, search engine 172, and/or data sources 130 based on a search query, and/or providing that knowledge to a user 142 in a user-friendly format, such as a listing, table, and/or visual representation.

Search engine 170 may receive search requests (e.g., from user 142 via client 140). Search engine 170 may parse the search request to determine the type of search to be performed. Based on the type of search, search engine 170 may formulate and submit a query to ontology 162 (e.g., via knowledge management engine 160) and/or to search index 172. In some embodiments, ontology 162 and search index 172 may be queried in parallel. In certain other embodiments, the query submitted to ontology 162 may be formulated based on the results of querying search index 172.

If the search request is for information that is not stored or available in ontology 162 and/or search index 172, search engine 170 may utilize agent director 150 and/or data agents 152 to retrieve the information from the appropriate data sources 130. Search engine 170 may determine the appropriate data sources 130 and/or the location of the desired information within the data sources 130 based on information stored in ontology 162 and/or search index 172. Agent director 150 and/or data agents 152 may retrieve data from the specified data sources 130 and locate the desired information.

After gathering the results from ontology 162, search index 172, and/or data sources 130, search engine 170 may format the results into a search listing, table, or other suitable format for display. The search results may then be transmitted to user 142 for display on client 140 via GUI 144. The above functions of search engine 170 will be described in more detail below in connection with FIGS. 8-9.

Visualization engine 180 may receive visualization requests (e.g., from user 142 via client 140). Visualization engine 180 may parse the visualization request to generate a search query. In generating the search query, visualization engine 180 may apply visualization rules to limit and/or reduce the scope and/or volume of search results that may be returned from the query. Visualization engine 180 may submit the search query to search engine 170. Visualization engine 180 may then generate a visual representation of the results received as a result of the search query. Using visualization rules, visualization engine 180 may reduce the amount of data to be presented in the visual representation and may apply styles and/or formatting to make the visual representation easier to read and/or understand. The resulting visual representation may then be transmitted to user 142 for display on client 140 via GUI 144. An example method for knowledge visualization is described in more detail below in connection with FIG. 10.

Figure 2D:
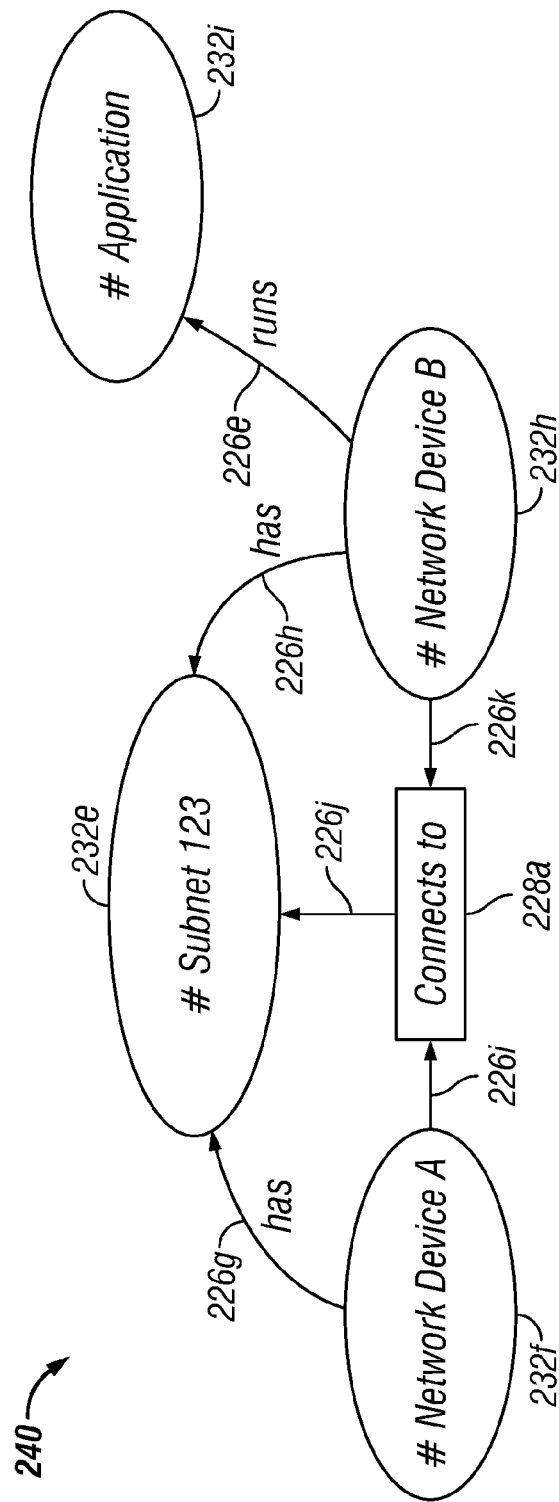

FIGS. 2A-2D illustrate an example ontology 162, according to certain embodiments of the present disclosure. As described above, ontology 162 may be a formal representation of knowledge. As shown in FIG. 2A, ontology 162 may include three segments: upper ontology 210, middle ontology 220, and lower ontology 230. Upper ontology 210 may contain high level semantics and rules for modeling knowledge. In some embodiments, a standardized upper ontology 230 may be used in order to promote interoperability by allowing the use of any middle ontology 220 designed to work with that upper ontology 230.

Middle ontology 220 may model how the knowledge to be stored in ontology 162 fits together. In particular, middle ontology 220 may contain concepts 224a-g, as well as relationships between those concepts. Middle ontology may be logically subdivided into one or more domains 222a-b. Each domain 222 may represent a particular conceptual space which may pertain to any subject matter in which ontology 162 is designed to model knowledge. For example, one domain 222 could be computer networking concepts. Another domain 222 could be technology architectural concepts. A third domain could be business terms and definitions. In the example of FIG. 2A, domain 222a contains concepts 224a-d, and domain 222b contains concepts 224e-g.

Lower ontology 230 may contain the knowledge generated based on data sources 130. In particular, lower ontology 230 may contain instances 232a-d, as well as the relationships between those instances. Each instance 232 may be associated with and/or have a relationship with one or more concepts 224 from middle ontology 220. In other words, each instance 232 may be an instance of a particular concept or group of concepts. Each instance 232 may reflect a real world instance of an abstract concept 224 but may not necessarily correspond to a physical objects. For example, an instance of an IP address may be represented by the string "10.10.10.1" which may reflect a real world IP address but may not directly reflect a physical asset (e.g. a particular computer or device). Thus, ontology 162 may store concepts, instances, and relationships between the concepts and instances.

FIG. 2B illustrates an example middle ontology 220a, according to certain embodiments of the present disclosure. Middle ontology 220a contains concepts 224h-m and relationships 226a-f between concepts 224h-m. In some embodiments, each relationship 226 may have an associated property which defines the relationship (shown in FIG. 2B as text next to the arrows that represent relationships 226). In some embodiments, each relationship 226 may have an associated directionality. The directionality may indicate the direction in which concepts 224 may be logically traversed in reasoning about the associations between concepts 224.

In the example of FIG. 2B, concept 224l represents a server. Concept 224l also has relationship 226e to concept 224k (application) through the property "runs." This represents the fact that a server runs an application. Concept 224l also has relationship 226d to concept 224j (network adapter) through the property "has." This represents the fact that a server has a network adapter. Because of the directionality, if a particular instance 232 is conceptually represented as a server (e.g., has an association with and/or a relationship with concept 224l), it can be inferred that the particular instance 232 must have a relationship with a second instance 232 that is conceptually represented as a network adapter. If that second instance 232 is not in ontology 162, knowledge management engine 160 can use such inferences to create the second instance 232 (along with the appropriate relationships) as a placeholder for the missing data until further information about that network adapter is known and can be filled in.

Concept 224j (network adapter) has relationship 226a to concept 224h (IP address) through the property "has." This represents the fact that a network adapter has an IP address. Concept 224j (network adapter) also has relationship 226b to concept 224i (subnet address) through the property "has." This represents the fact that a network adapter has a subnet address.

Concept 224m (network device) has relationship 226c to concept 224j (network adapter) through the property "has." This represents the fact that a network device has a network adapter. By extension, and continuing to follow relationships 226a-b according to their associated directionality, a network device also has a network adapter which has an IP address and a subnet address. Concept 224m (network device) also has relationship 226f with itself through the property "connects to." This represents the fact that a network device connects to one or more other network devices.

Middle ontology 220a may also contain implications, which may be used by knowledge management engine 160 to refine a knowledge assertion, validate a knowledge assertion, and/or draw inferences about a knowledge assertion. The implications may also be used to reason over incomplete data, as will be described below in connection with FIG. 2D. Some implications may add concepts together. For example, one implication in middle ontology 220a may specify that a server that has a network adapter is also a network device. Other implications may allow for the creation of new properties and/or relationships. For example, a second implication in middle ontology 220a may specify that if a first network device has a subnet address (of its network adapter) that is the same as the subnet address of a network adapter of a second network device, then the first network device connects to the second network device. Thus, a relationship could be created between the two through the property "connects to."

For the sake of clarity, middle ontology 220a is a fairly simple example, containing relatively few concepts 224 and relationships 226. As the above discussion shows, it nevertheless permits inferential reasoning on multiple levels about the represented concepts 224. It should be understood that ontology 162 may contain any suitable number of concepts 224 and relationships 226 between the concepts. In some embodiments, the resulting conceptual network may be highly complex, such that effective logical traversal of the network may require a computer as a practical matter.

FIG. 2C illustrates an example lower ontology 230a, according to certain embodiments of the present disclosure. Lower ontology 230a contains instances 232e-g and relationships 226g-h between instances 232e-g. In some embodiments, each relationship 226g-h may have an associated property which defines the relationship (shown in FIG. 2C as text next to the arrows that represent relationships 226). In some embodiments, each relationship 226 may have an associated directionality. The directionality may indicate the direction in which instances 232 may be logically traversed in reasoning about the associations between instances 232.

In the example of FIG. 2C, lower ontology 230a contains four instances 232: #NetworkDeviceA (instance 2320, #ServerB (instance 232g), #Application (instance 232i), and #Subnet123 (instance 232e). As a convention, throughout this disclosure, instance names are preceded by a pound sign in order to distinguish them from concept names. This convention is merely intended to provide clarity and facilitate understanding, and should not be understood to limit instances 232.

Instance 232g (#ServerB) is conceptually represented by concept 224l from FIG. 2B (server). In other words, #ServerB is an instance of the concept Server. Likewise, instance 232f (#NetworkDeviceA) is conceptually represented by concept 224m from FIG. 2B (network device); instance 232i (#Application) is conceptually represent by concept 224k from FIG. 2B (application); and instance 232e (#Subnet123) is conceptually represented by concept 224i from FIG. 2B (subnet address) Again, the similarity in the names between these concepts and instances is for the purpose of clarity, but is not required.

Instance 232g (#ServerB) has relationship 226h with instance 232e (#Subnet123) through the property "has." This represents the fact that server #ServerB has a subnet address of #Subnet123. Instance 232g (#ServerB) also has relationship 226l with instance 232i (#Application) through the property "runs." This represents the fact that server #ServerB runs application #Application. Instance 232f (#NetworkDeviceA) has relationship 226g with instance 232e (#Subnet123) through the property "has." This represents the fact that network device #NetworkDeviceA has a subnet address of #Subnet123.

From this knowledge in lower ontology 230a, additional knowledge can be inferred. FIG. 2D illustrates an example knowledge assertion 240. Knowledge assertion 240 may represent the result of knowledge refinement and/or reasoning over incomplete data performed by knowledge management engine 160.

First, knowledge management engine 160 can use the first implication in middle ontology 220a (described above in connection with FIG. 2B), which specifies that a server that has a network adapter is also a network device. Server #ServerB (instance 232g) has a subnet #Subnet123 (instance 232e). Therefore, as specified by the conceptual relationships shown in FIG. 2B, #ServerB must have a network adapter, even though that network adapter is not presently represented in lower ontology 230a. Because #ServerB is a server and has a network adapter, it must be a network device according to the first implication. Therefore, in knowledge assertion 240, server #ServerB (instance 232g) has been replaced with network device #NetworkDeviceB (instance 232h). Thus, #NetworkDeviceB is an instance of the concept "network device," which is a union of two concepts, "server" and "network adapter." As for the network adapter of #ServerB, which is not in ontology 230a, knowledge management engine may generate a placeholder for the missing data (e.g. using a skolem constant). If a user requests specific details about the network adapter, for example via a search request, knowledge management engine 160 and/or search engine 170 may delegate out to agent director 150 and/or data agents 152 to fetch the missing information about the network adapter from the appropriate data source 130. This process will be described in more detail in connection with FIGS. 8-9.

Second, knowledge management engine 160 can use the second implication in middle ontology 220a, which specifies that if a first network device has a subnet address (of its network adapter) that is the same as the subnet address of a network adapter of a second network device, then the first network device connects to the second network device. Newly created instance 232h (#NetworkDeviceB) is a network device that has a subnet #Subnet123. #NetworkDeviceA (instance 232f) is also a network device that has the same subnet #Subnet123. Therefore, according to the second implication, knowledge management engine 160 can infer that #Network DeviceA connects to #NetworkDeviceB, which both connect to #Subnet123. Knowledge management engine 160 may create relationships 226i-k through property 228a to represent this newly inferred knowledge.

Third, using the conceptual relationships defined in middle ontology 220a, knowledge management engine 160 can infer second-order facts. For example, network device #NetworkDeviceB runs application #Application and connects to network device #NetworkDeviceA, according to the newly inferred knowledge. Based on these relationships, knowledge management engine 160 can further infer that application #Application is accessible from network device #NetworkDeviceA.

Thus, knowledge assertion 240 may represent the results of knowledge refinement by knowledge management engine 160 using any combination of inferential reasoning and reasoning over missing data based on implications and/or conceptual and semantic relationships defined in ontology 162.

Figure 3:
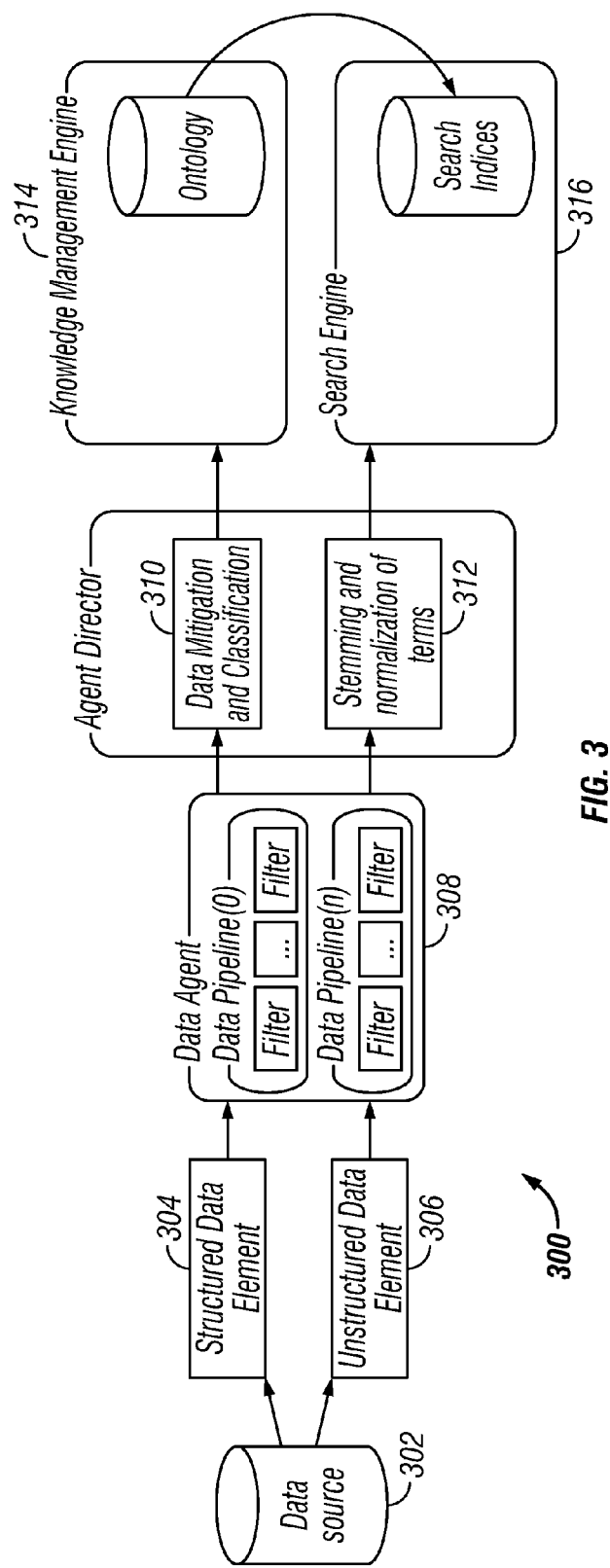
FIG. 3 illustrates an example block diagram for knowledge gathering, according to certain embodiments of the present disclosure.

FIG. 3 illustrates an example block diagram 300 for knowledge gathering, according to certain embodiments of the present disclosure. Block diagram 300 illustrates an example flow of information from a data source 130 to ontology 162 and/or search index 172. At block 302, a data agent 152 may retrieve data from data source 130. In some embodiments, multiple data agents 152 may retrieve and process data from the same data source 130 in parallel. Agent director 150 may use any logical divisions in data source 130 to assign multiple data agents 152 to this task. For example, if the data source 130 is a database with ten tables, agent director 150 may assign ten data agents 152 to retrieve and process the data, with each data agent 152 responsible for one of the tables. Alternatively, a single data agent 152 may retrieve data from data source 130, but may use multiple parallel data pipelines to process the data, as shown in block 308 and described below.

At block 304, data agent 152 may identify one or more structured data elements among the data retrieved from data source 130. The data structure storing structured data elements may provide information about the relationships between those structured data elements. For example, each cell, row, and/or column in a spreadsheet may be considered a structured data element. The arrangement of the cells, rows, and/or columns may indicate relationships between them. Cells in a single row or column may relate to common subject matter, for instance, which may be described by a heading or other label for the row or column. Other examples of structured data include a database, a table, comma-separated values, XML, and HTML. Structured data elements may be nested, in some embodiments. For example, a field in a database may contain a table. Thus, a structured data element may be made up of any number and combination of structured data elements and/or unstructured data elements.

At block 306, data agent 152 may identify one or more unstructured data elements among the data retrieved from data source 130. An unstructured data element may be, for example, an individual word or phrase in a block of text in a flat text file. As described above, unstructured data elements may also be found nested within structured data elements.

At block 308, data agent 152 may process the structured and/or unstructured data elements using one or more parallel data pipelines. As described above, multiple data pipelines can be used to process data from a single data source 130. For example, a database containing ten tables could be processed using ten pipelines operating in parallel, with one pipeline processing each table.

Each data pipeline may be constructed as a filter-chain pattern (e.g., a chain of successive filtering processes). Because a data pipeline is itself a filtering process, data pipelines may be nested and/or chained together within a data pipeline. The filtering processes used in a data pipeline may include text encoders, parsers, analyzers, data classifiers. The filtering processes may also enable web scraping and/or streaming of data from a data source 130. The structured data elements and unstructured data elements may be processed separately in certain embodiments. Processing of structured data elements will be discussed first.

Structured Data Elements

Data agent 152 may pull apart the structured data elements using the filtering processes, resulting in a collection of tokens. Data agent 152 may then classify each token based on the conceptual framework provided by ontology 162. For example, data agent 152 may determine that a token should be represented by a particular concept in ontology 162. In certain embodiments, data agent 152 may determine that the token is already represented by a particular instance in ontology 162 and may additionally classify the token to that instance. Data agent 152 may perform the classification using classification rules.

The classification rules may implement a number of classification strategies, such as constant/literal matching, pattern matching, data concept bindings, data generalizations, neural network classification, conditional probability (Bayesian) classification, production rule based classification, and/or any other suitable strategy. Constant/literal matching may refer to matching the contents of a structured data element against a label associated with a concept in ontology 162. Pattern matching may refer to applying a set of regular expressions to the data in order to parse and classify the data to a concept in ontology 162. Data concept bindings may refer to a strict mapping of a discrete data element to a particular concept. Data generalizations may refer to classifying specific data into a larger set (e.g., generalizing an exact measurement of a men's dress shirt "17/32" into the group "size large.") Neural network classification may refer to classifying data using a multi-layered feed-forward back-propagation neural network that is initially derived from ontology 162 and reinforced/trained over time using data heuristics generated by data agents 152, agent director 150, and/or knowledge management engine 160 (such as data source statistics, concept statistics, and/or instance statistics). Conditional probability (Bayesian) classification may refer to classifying data based on a probability function based on dependencies between elements in a data source and/or concept statistics retrieved from ontology 162. Production rule based classification may refer to classifying data based on if-then rules that can be used to steer or adjust data that falls outside of a normal or expected range.

In certain embodiments, data agent 152 may be unable to classify a particular token to a particular concept or instance in ontology 162, but may still be able to identify a relevant conceptual domain within ontology 162. For example, data agent 152 may be able to determine that the structured data elements relate to technology architectural concepts (such as servers and networking components). Data agent 152 may provide such information to agent director 150, which may attempt to classify the data using some or all of the strategies described above. Shifting more computationally intensive classifications to agent director 150 rather than performing them at data agents 152 may be more efficient and/or provide better performance in certain embodiments.

In classifying the tokens, data agent 152 may also determine the relationships between the tokens. As an example, if data agent finds a structured data element that it classifies to the concept "server" and a structured data element that it classifies to the concept "application," it may determine, based on the particular data structure, that the two tokens should be related through an appropriate property in ontology 162 (e.g., through the property "runs"). In that case, data agent 152 may create the appropriate relationship between the two classified tokens. In certain embodiments, each concept in ontology 162 may have certain required properties for which a relationship must be assigned in order for a token to be classified to that concept. A property may specify the concept or concepts for which a relationship may be assigned through that property. For example, the property "runs" of concept "server" may specify that the property can be satisfied by a relationship with a concept "application."

In certain embodiments, if a data agent 152 finds more than one possible concept from the ontology 162 for which all the required properties can be satisfied, data agent 152 may select the more specific concept and/or the concept that allows for the creation of a greater number of relationships. For example, if one of the two concepts is a subclass of the other and/or requires a greater number of properties, that concept may be used to classify the token.

The resulting collection of classified tokens along with the relationships among them produced by data agent 152 is an example of a knowledge assertion. Another example knowledge assertion will be described in connection with FIG. 6.

At block 310, data agent 152 may provide the knowledge assertion generated using the structured data elements to agent director 150. Agent director 150 may then perform data mitigation and/or further classification. As described above, agent director 150 may classify any tokens that data agent 152 was unable to classify. Agent director 150 may use any of the classification methods described above, some of which may be computationally intensive. Agent director 150 may also use stochastic methods. For example, agent director 150 may probabilistically evaluate the classification based on the kind of information expected from the particular type of structured data or field in which the token was found based on past experience. Past experience may be reflected in data source statistics and/or concept statistics stored in ontology 162.

Agent director 150 may also perform data mitigation. Data mitigation may refer to detecting and/or resolving conflicts and/or inconsistencies among the classified tokens provided by data agent 152. Data mitigation may be performed using concept statistics, data source statistics, and/or conformity methods. For each classified token, agent director 150 may compute a quality score, which may be used in data mitigation and eventually stored in ontology 162 (where it may later be used for knowledge mitigation). When classified tokens are in conflict, agent director 150 may select the token with the higher quality score and discard the other conflicting tokens. A specific example of data mitigation is discussed in connection with FIGS. 7A-7B. In some embodiments, a quality score may be computed and stored even when no conflict is detected. Classified tokens with quality scores below a certain threshold may be removed from the knowledge assertion in certain embodiments.

The quality score may represent an estimate of the probability that the classified token and its relationships accurately reflect the knowledge they model. The quality score may be computed based on the trust score for the data source 130 from which the classified token was generated, the rate of decay for the data source 130, and one or more conformity methods. The trust score may be a normalized weighting indicating a relative level of belief in the correctness of the information found in data source 130. Some data sources 130 may contain more accurate data than others. Processing inaccurate data may lead to inaccurate knowledge assertions, even if the system correctly processes the data. In some embodiments, a data source 130 may have multiple trust scores. For example, the scores may be computed and maintained separately for specific data structures, structured data elements, and/or types of data within the data source 130. Trust scores may be updated based on the number and/or frequency of conflicts that arise with respect to data from a given data source 130. The rate of decay, as discussed previously, reflects the rate of change of content in the data source 130. For example, a rate of decay of 1 may indicate constantly changing data, such as real-time feed, whereas a rate of decay of 0 may indicate static data that never changes. In some embodiments, the rate may be computed and maintained separately for specific data structures, structured data elements, and/or types of data within the data source 130.

Conformity methods evaluate the classified token and/or its associated relationships based the degree to which it conforms to what would be expected based on the concept to which it is classified. In other words, the conformity method reflects how accurately the token represents the concept. For example, conformity methods may evaluate some or all of the following questions. Is the token the correct type based on the concept (e.g., integer, decimal, date, formatted string)? Does the token match an expected pattern (e.g. expected format for an IP address)? Is the token in the anticipated range based on the concept (e.g. concept "city"—compare against list of possible cities)? Does the token phonically match anything in the anticipated range based on the concept (e.g. may correct for misspellings and/or typographical errors)? Does the token have a symbolic match to any instances in the ontology (e.g. does the ontology already know about the thing this token represents)? Conformity methods may also include custom evaluations involving correlating multiple classified tokens.

At block 314, agent director 150 may provide the knowledge assertion to knowledge management engine 160. Knowledge management engine 160 may evaluate the proposed knowledge assertion against knowledge already contained in ontology 162. For example, knowledge management engine 160 may ensure that the proposed knowledge assertion is consistent with ontology 162. If a conflict or inconsistency is detected, knowledge management engine 160 may use knowledge mitigation to resolve the conflict. Knowledge mitigation may be performed using instance statistics, data source statistics, and/or conformity methods Knowledge mitigation may be performed using techniques analogous to those described above in connection with data mitigation. For example, in the case of a conflict between a classified token and an instance already in ontology 162, knowledge management engine 160 may use the quality scores to choose between the competing knowledge representations. The quality score for the classified token may be computed by knowledge management engine 160 and/or included as metadata in the knowledge assertion received from agent director 150. Likewise, the quality score for the instance already in ontology 162 may be computed by knowledge management engine 160 (e.g. based upon source information and/or other metadata stored with the instance) and/or retrieved from ontology 162 where it may be stored along with the associated instance (e.g. as metadata).

Knowledge management engine 160 may refine the proposed knowledge assertion. For example, knowledge management engine 160 may make the knowledge assertion more specific using other knowledge in ontology 162. Knowledge management engine 160 may use implications and/or rules in ontology 16 to draw inferences from the proposed knowledge assertion, as described above in connection with FIG. 2D. Similarly, knowledge management engine 160 may be able to reason over missing and/or uncertain data.

Knowledge management engine 160 may compare the knowledge assertion to ontology 162 to determine if the knowledge assertion contains new, additional, or more specific knowledge than the knowledge already present in ontology 162. For example, knowledge management engine 160 may determine if classified tokens in the knowledge assertion correspond to one or more instances already present in ontology 162. If so, knowledge management engine 160 may compare the classification of the token with the concept currently associated with the instance to determine if which information is more specific. Knowledge management engine 160 may compare the relationships associated with the classified token in the knowledge assertion against the relationships associated with the instance in ontology 162 to determine if the knowledge assertion contains new, updated, or more specific relationship information. Based on the comparison, knowledge management engine 160 may determine that ontology 162 should be updated with all, part, or none of the knowledge contained in the proposed knowledge assertion.

At block 316, search engine 170 may index information stored in ontology 162. Search engine 170 may generate and/or update search index 172 to facilitate searching of ontology 162. Search engine 170 may index each instance and/or concept stored in ontology 162. In certain embodiments, search engine 170 may only index instance data for certain properties of a concept in ontology 162. For example, the most likely properties to be identified in a search request may be defined for each concept. A server's hostname, subnet, and manufacturer may be indexed, for instance, but not the server's operating system version number. These properties to be indexed for a given concept may be updated empirically based on actual user search requests (e.g. using appropriate statistical methods).

Search engine 170 may also include a human-readable label associated with each instance and/or concept in ontology 162. Along with each instance and/or concept, search engine 170 may store associated information indicating where those instances and/or concepts can be found in ontology 162, such as a pointer or reference to the location of the data in ontology 162. Thus, search index 172 may be structured to allow for text searching of instance data and/or concept data in ontology 162.

Unstructured Data Elements

Returning to block 308, data agent 152 may parse the unstructured data elements retrieved from data source 130 using the filtering processes described above, resulting in a collection of tokens. In some embodiments, because unstructured data elements may not contain relational information and/or may not correspond to concepts and/or instances in ontology 162, unstructured data elements may not be classified or stored in ontology 162. Instead, unstructured data elements may be processed and routed to search index 172 for later retrieval if relevant to a user's knowledge search. Data agent 152 may compile and/or generate source information which will facilitate later retrieval of the unstructured data element from data source 130. For example, source information may include a pointer or reference to the data source 130 and/or the unstructured element within the data source 130. Source information may be any suitable information that allows data agent 152 to locate the unstructured data element.

At block 312, data agent 152 may provide the tokens and source information to agent director 150. Agent director 150 may process the tokens using stemming algorithms, normalization algorithms, and/or any other suitable operations to produce a set of terms that can be included in search index 172. Stemming may refer to taking a token to its root (e.g. "fished" and "fisher" may become "fish"). Normalization may refer to reducing variation among tokens. Any other suitable operations may be performed to produce a reduced set of the base terms found in the tokens. Such operations may reduce unnecessary noise and/or clutter in the search index 172 in order to facilitate higher quality results in response to a search request.

At block 316, agent director 150 may provide the terms and source information to search engine 170. Search engine 170 may generate and/or update search index 172 to facilitate searching of the information found in the unstructured data elements. Search engine 170 may index each term provided by agent director 150. Along with each term, search engine 170 may store associated information indicating where the term can be found, such as a pointer or reference to the location of the term in data source 130 (e.g. the source information provided by agent director 150). Thus, search index 172 may be structured to allow for text searching of unstructured data elements in data sources 130.

Figure 4:
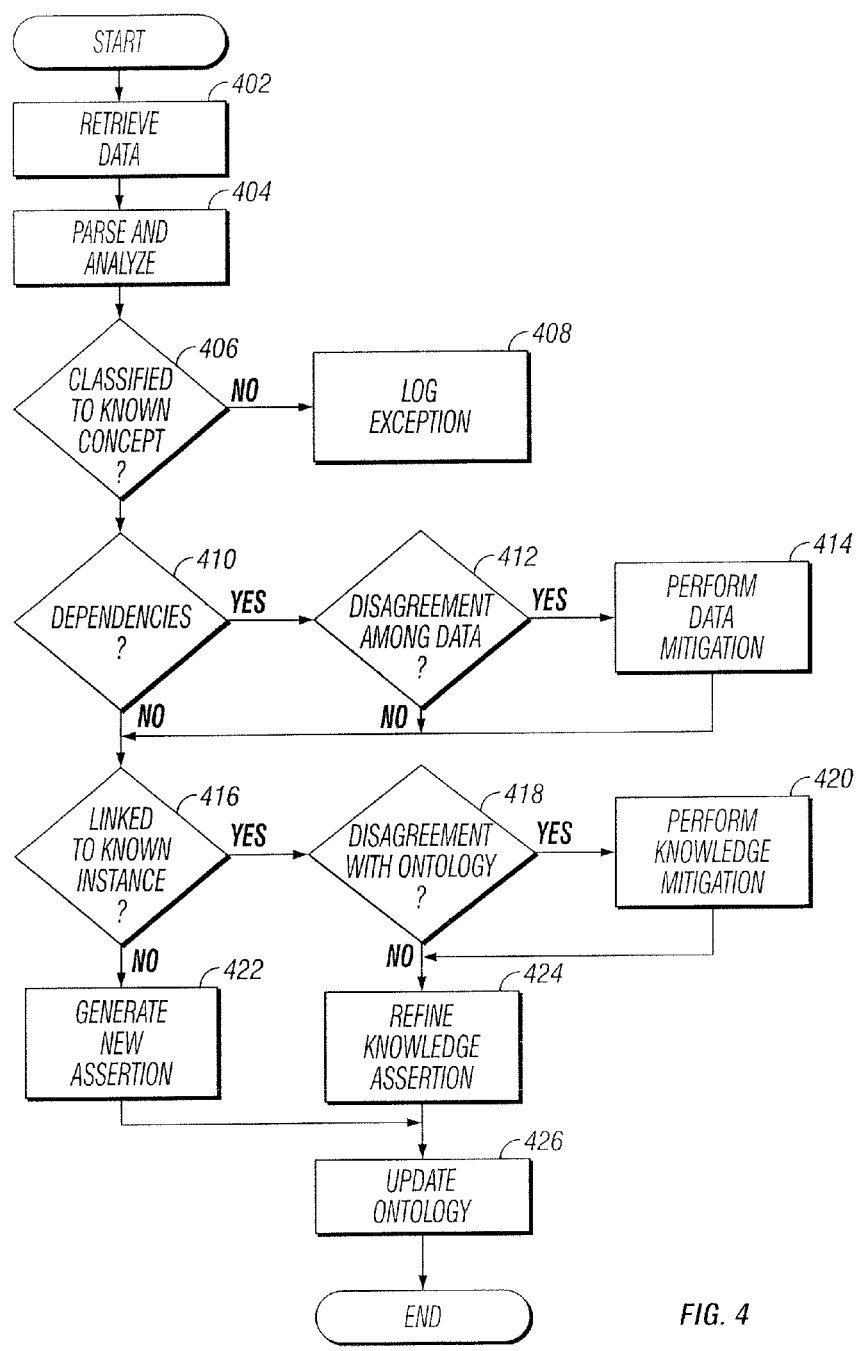
FIG. 4 illustrates an example method for knowledge gathering, according to certain embodiments of the present disclosure.

FIG. 4 illustrates an example method 400 for knowledge gathering, according to certain embodiments of the present disclosure. The method begins at step 402, where data is retrieved from a data source 130. One or more data agents 152 may access data source 130 and retrieve structured and/or unstructured data elements. At step 404, data agents 152 may parse and analyze the retrieved data elements using any suitable filter processes. For example, data agents 152 may utilize a parallel data pipeline architecture, as described above in connection with FIG. 3. Data agents 152 may pull apart a structured data element to produce a plurality of tokens.

At step 406, data agents 152 and/or agent director 150 determine whether each token can be classified to a known concept in ontology 162. Data agents 152 and/or agent director 150 may use any of the classification methods described above in order to classify the tokens. If a token cannot be classified, the method proceeds to step 408, where an exception is logged. Details about the classification strategies employed, the data source 130 from which the token was generated, and any other relevant information may be logged. This may allow for improvements to the classification strategies and/or new concepts or domains being added to ontology 162 in order to reduce the likelihood of failed classifications in the future.

If the token is successfully classified, the method proceeds to step 410. At step 410, agent director 150 determines whether there are any known statistical dependencies between the classified tokens generated from the data source 130. Fields within a database or spreadsheet (e.g. within a structured data element) may be correlated. For example, data found in a field labeled "City" may be found or expected to have a moderate to strong correlation with data in a field labeled "ZIP code," whereas data in a field labeled "First Name" may have little or no correlation with data in a field labeled "State." Likewise, dependencies may be inferred based on concept statistics associated with the concepts in ontology 162 to which the tokens are classified. The concept statistics may include information about expected and/or observed statistical correlation between related concepts, such as a dependency matrix. The dependency matrix may reflect the correlation of each pair of concepts in the matrix. The correlation may reflect the number and/or degree of relationships between the two concepts in some embodiments.

If insufficient dependencies are identified between the classified tokens (e.g. dependency below a certain threshold), the method proceeds to step 416. If, however, sufficient dependencies are identified, the method proceeds to step 412. At step 412, agent director exploits the statistical dependencies, as well as information from ontology 162 to determine whether there is a conflict among the classified tokens. A conflict may be any disagreement in the knowledge assertion, including direct disagreement or logical inconsistency. If no conflict is identified, the method proceeds to step 416. If a conflict is found, the method proceeds to step 414, where agent director 150 attempts to resolve the conflict using data mitigation techniques. Agent director 150 may perform data mitigation using concept statistics associated with the concepts the tokens are classified to, data source statistics associated with the data source from which the tokens were generated, and/or conformity methods. Agent director 150 may compute a quality score for each conflicting token and keep only the conflicting token with the highest quality score to resolve the conflict.

At step 416, knowledge management engine 150 determines whether each classified token can be linked to a known instance in ontology 162. For example, if the token conceptually represents an particular IP address, knowledge management engine 150 may determine whether an instance of that particular IP address is already in ontology 162. If not, the method proceeds to step 422. If a known instance is found, however, the method proceeds to step 418. In certain embodiments, linking to a known instance may be performed by agent director 150 at the time the quality score is computed for the token (e.g. during data mitigation).

At step 422, knowledge management engine 150 generates a new knowledge assertion built around the classified token that could not be linked to a known instance. Knowledge management engine 150 may create a new instance of the concept the token is classified to. Knowledge management engine 150 may also create relationships to other instances and/or concepts as necessary to satisfy any required properties of the concept the token is classified to. The information necessary to generate the new knowledge assertion may be found in the proposed knowledge assertion provided by agent director 150 and/or in ontology 162. At step 426, ontology 162 is updated with the new knowledge assertion. The newly created instance and its associated relationships become part of the network of associations stored in ontology 162. The method then ends.

Returning to step 418 (the case where a known instance can be linked to the classified token), knowledge management engine determines whether there is a conflict between the classified token and its associated relationships on the one hand, and the known instance and its associated relationship on the other. A conflict may be any disagreement between the proposed knowledge assertion and the knowledge already contained in ontology 162, including direct disagreement or logical inconsistency. If no conflict is identified, the method proceeds to step 424. If a conflict is found, the method proceeds to step 420, where knowledge management engine 160 attempts to resolve the conflict using knowledge mitigation techniques. Knowledge management engine 160 may perform knowledge mitigation using instance statistics associated with any conflicting instance, data source statistics associated with the data source from which the conflicting instances were generated, and/or conformity methods. Agent director 150 may compute a quality score for each conflicting instance and/or token and keep only the conflicting data with the highest quality score to resolve the conflict. Thus, if all or part of the proposed knowledge assertion is determined to have a higher quality score than the conflicting knowledge in ontology 162, the conflicting knowledge in ontology 162 will be replaced with all or part of the proposed knowledge assertion.

At step 424, knowledge management engine 160 may refine the proposed knowledge assertion. Knowledge management engine 160 may use knowledge and/or implications in ontology 162 to determine if the proposed assertion can be modified to contain more specific knowledge. As a simple example, suppose the knowledge assertion contains a token that was classified to the concept "server," and the known instance to which the token has been linked is known to run an application that hosts web content (e.g. the instance is linked to that application through the property "runs"). In that case, knowledge management engine 160 may be apply to reclassify the token using the more specific concept "web server." Other examples of knowledge refinement are discussed above in connection with FIG. 2D.

At step 426, once the knowledge assertion was been refined, knowledge management engine 160 updates the ontology based on the refined assertion. Knowledge management engine 160 compares the assertion against the knowledge already contained in ontology 162. If the refined assertion contains new or more specific knowledge than ontology 162, ontology 162 may be updated with only the new or more specific portions of the knowledge assertion. Those instances and their associated relationships become part of the network of associations stored in ontology 162.

In certain embodiments, knowledge management engine 160 may only store instance data for certain properties of a concept in ontology 162. For other properties, ontology 162 may store a placeholder rather than the actual data. The placeholder may indicate where the information may be found (which data source 130 and/or where in the data source 130), so that the information can be retrieved if needed.

Thus, based on the comparison, knowledge management engine 160 may update the ontology with some, all, or none of the refined knowledge assertion. The method then ends.

Figure 5:
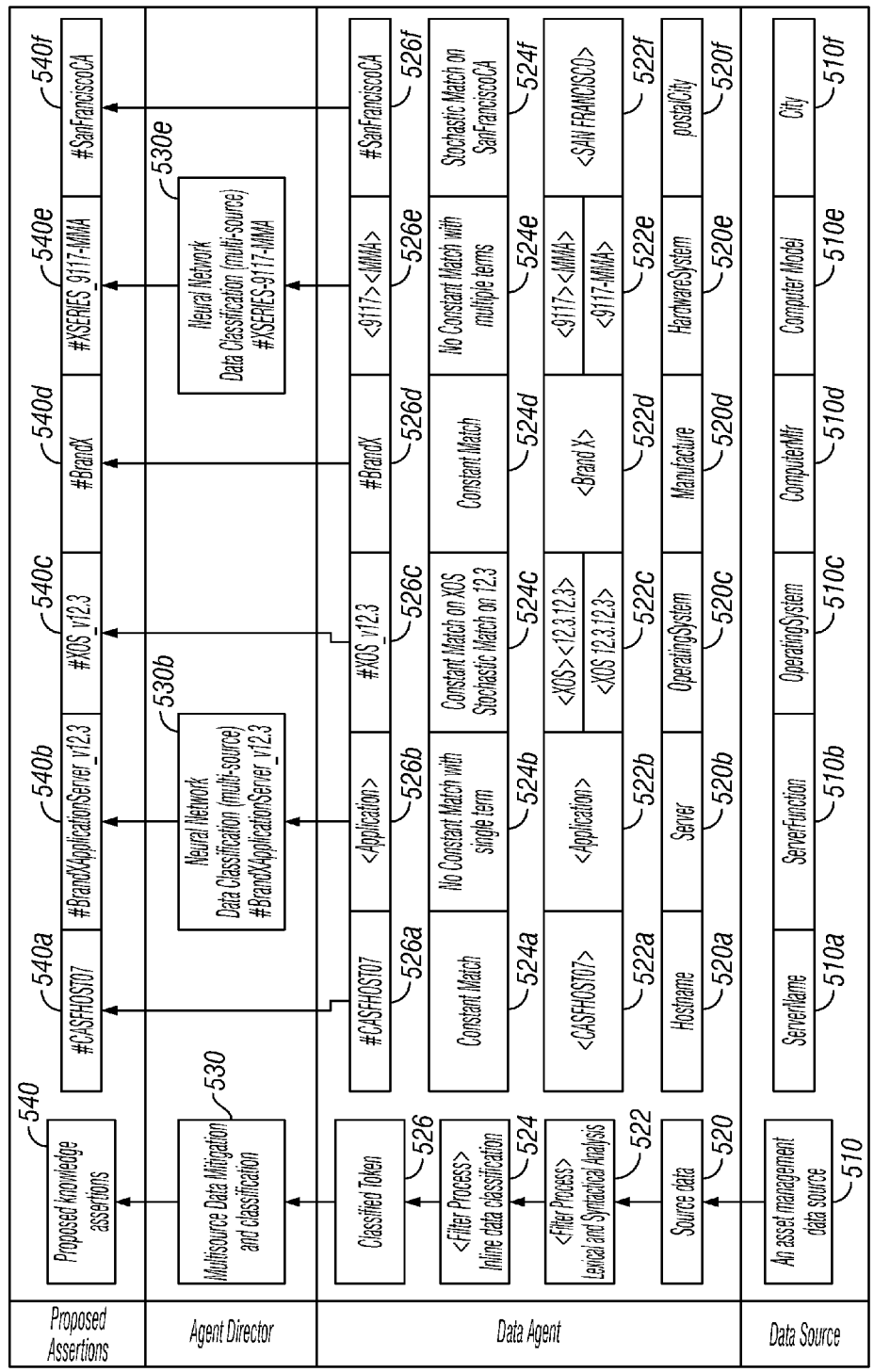
FIG. 5 illustrates an example of generating a proposed knowledge assertion from a data source, according to certain embodiments of the present disclosure.

FIG. 5 illustrates an example of generating a proposed knowledge assertion from a data source, according to certain embodiments of the present disclosure. In this example, processing of data flows from bottom to top, as indicated by the arrows. At block 510, a structured data element is retrieved from a data source. The data source may be an asset management data source, which may contain information about network devices and/or other computing assets. Blocks 510a-f may represent data fields that make up the structure of the structured data element. In this example, the fields are labeled "ServerName," "ServerFunction," "OperatingSystem," "ComputerMfr," "Computer Model," and "City," for blocks 510a-f, respectively.

At block 520, data agent 152 may determine the appropriate binding between the structured data element and ontology 162. For example, data agent 152 may link each field of the data source to a concept in ontology 162. Once determined, the bindings may be stored and retrieved for later processing of other data elements from the same data source in certain embodiments. Blocks 520a-f represent the concepts linked to the fields from blocks 510a-f, respectively. The linked concepts are "Hostname," "Server," "OperatingSystem," "Manufacture," "HardwareSystem," and "postalCity," for blocks 520a-f, respectively. These concepts may be used to classify data from each field of the structured data element.

At block 522, data agent 152 utilizes a filter process to perform lexical and syntactical analysis of the data in each field of the structured data element. The filter process may break down and pull apart the data to generate tokens. The resulting tokens from fields 510a-f are shown in blocks 522a-f, respectively. In this example, each token is a string of characters. The token produced in block 522a is "<CASF-HOST07>," which may be classified by the concept "Hostname." The token produced in block 522b is "<Application>," which may be classified by the concept "Server." The token produced in block 522c is "<XOS 12.3.12.3>." The filter process may be recursive. Here, data agent 152 determines that this token should be broken into two separate tokens—"<XOS>" and "<12.3.12.3>"—which may be classified by the concept "OperatingSystem." The token produced in block 522d is "<Brand X>," which may be classified by the concept "Manufacture." The token produced in block 522e is "<9117-MMA>," which is recursively processed to strip out the hyphen and produce two tokens—"<9117>" and "<MMA>." These tokens may be classified by the concept "HardwareSystem." The token produced in block 522f is "<SAN FRANCISCO>," which may be classified to the concept "postalCity."

At block 524, data agent 152 utilizes a filter process to perform inline data classification. Blocks 524a-f indicate the classification strategies that are used to classify the data resulting in the classified token shown in blocks 526a-f, respectively. In block 526a, data agent 152 uses a constant match to identify an instance "#CASFHOST07" in ontology 162 that corresponds to the token "<CASFHOST07>." The token is classified to and/or replaced with the identified instance, as well as classified to the corresponding concept "HostName." In block 526b, data agent 152 is unable to identify an instance in ontology 162 that corresponds to the token "<Application>." Data agent 152 passes the token "<Application>" to agent director 150 for further processing and classification. In block 526c, data agent 152 uses two different strategies to identify an instance "#XOS_v12.3" in ontology 162 that corresponds to the tokens "<XOS>" and "<12.3.12.3>"—constant match for the former and stochastic match for the latter. 12.3 is not a literal match for 12.3.12.3, but given "XOS" and other data in ontology 162, data agent 152 may identify a sufficiently probable linked instance using any suitable statistical methods. For example, data agent may use conformity methods, which were discussed above in connection with FIG. 3. In block 526d, data agent 152 uses a constant match to identify an instance "#BrandX" in ontology 162 that corresponds to the token "<BrandX>."

In block 526e, data agent 152 is unable to identify an instance in ontology 162 that corresponds to the tokens "<9117>" and "<MMA>." Data agent 152 passes the tokens to agent director 150 for further processing and classification. In block 526f, data agent 152 uses a stochastic match to identify an instance "#SanFranciscoCA" in ontology 162 that corresponds to the token "<SAN FRANCISCO>." SAN FRANCISCO is not an exact match for SanFranciscoCA. In fact, there might be more than one city in ontology 162 called San Francisco (e.g. more than one instance of the concept "postalCity"). Data agent 152 may determine the most likely instance to match the token to using conformity methods and/or other statistical methods. For example, data agent may use statistical dependencies between the fields of the structured data element. Here, there at a weak to moderate dependency between the data in field "ServerName" and the data in field "City," because it appears that the server may have been named in part based on its location. Data agent 152 may determine, based on "CA" from the beginning of the sever name that the appropriate instance to match to "SAN FRANCISCO" is "#SanFranciscoCA."

At block 526, data agent 152 may assemble the classified tokens together into a knowledge assertion, which also includes relationships between the classified tokens. Data agent 152 may provide the knowledge assertion to agent director 150.

At block 530, agent director 150 may perform multisource data mitigation and classification. Agent director 150 attempts to determine if there are any corresponding instances in ontology 162 for 526b and 526e. In this example, agent director 150 uses a neural network-based classification strategy to identify corresponding instances, which may be based not only those particular tokens, but also other related tokens in the knowledge assertion. For block 530b, agent director 150 identifies instance "#BrandXApplicationServer_v12.3" based on evaluation of at least the tokens "<Application>," the instance "#BrandX," and the instance "#XOS_v12.3." For block 530e, agent director 150 identifies instance "#XSERIES_9117_MMA" based on evaluation of at least the tokens "<9117>," "<MMA>," and the instances "#BrandX" and "#XOS_v12.3." The identifications for blocks 530b and 530e may be performed in parallel, so that the resulting identifications may be correlated.

At block 540, agent director 150 provides the proposed knowledge assertion to knowledge management engine 160 for evaluation. The proposed knowledge assertion consists of the identified instances, shown in blocks 540a-f, as well as the relationships between those instances. The assertion may also include the concepts associated with each instance and metadata about each instance, such as a computed quality score, data source statistics, instance statistics, concept statistics, and/or any other suitable data.

Figure 6:
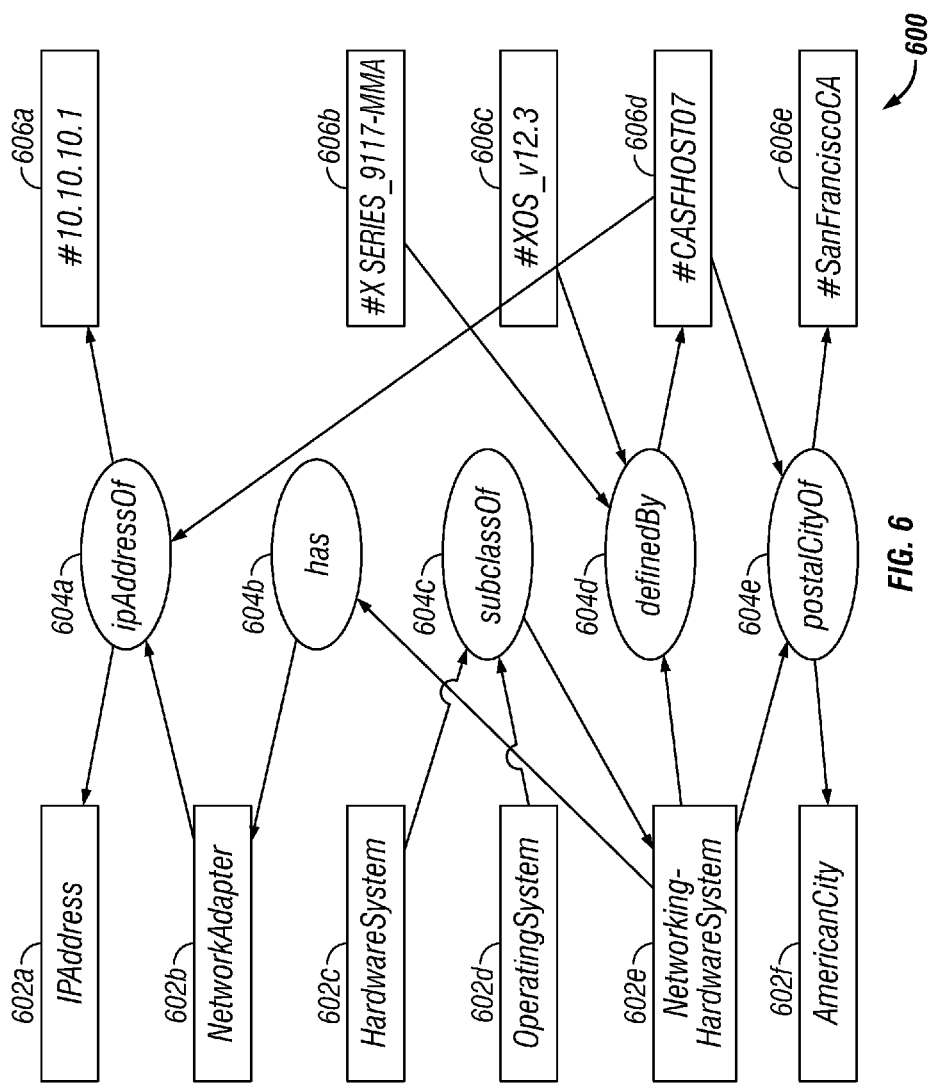
FIG. 6 illustrates an example embodiment of a knowledge assertion, according to certain embodiments of the present disclosure.

FIG. 6 illustrates an example embodiment of a knowledge assertion 600, according to certain embodiments of the present disclosure. Knowledge assertion 600 may be represented as a concept graph and/or a concept network in certain embodiments. Knowledge assertion 600 includes concepts 602a-f, properties 604a-e, and instances 606a-e. Knowledge assertion 600 also includes relationships between concepts 602a-f and instance 606a-e. Each relationship is made through a property and/or is defined by a property 604a-e.

"#10.10.10.1" (instance 606a) is an instance of "IPAddress" (concept 602a). "#XSERIES_9117_MMA" (instance 606b) is an instance of "HardwareSystem" (concept 602c). "#XOS_v12.3" (instance 606c) is an instance of "OperatingSystem" (concept 602d). "#CASFHOST07" (instance 606d) is an instance of "NetworkingHardwareSystem" (concept 602e). "#SanFranciscoCA" (instance 606e) is an instance of "AmericanCity" (concept 602f).

Knowledge assertion 600 conveys knowledge about the networking hardware system represented by the instance "#CASFHOST07," as well as the other instances 606. "#CASFHOST07" is defined by "#XSERIES_9117_MMA" and "#XOS_v12.3," according to relationships through property 604d. "#CASFHOST07" has an IP address of "#10.10.10.1," according to relationships through property 604a. "#CASFHOST07" has a postal city of "#SanFranciscoCA," according to relationships through property 604e.

Knowledge assertion 600 also conveys information about the semantic relationships between concepts 602a-f related to instances 606a-e. An instance represented by the concept "NetworkingHardwareSystem" has a postal city represented by the concept "AmericanCity" (property 604e). An instance represented by the concept "NetworkingHardwareSystem" also has a "NetworkAdapter" (property 604b). The concept "HardwareSystem" and the concept "OperatingSystem" are a subclass of the concept "NetowrkingHardwareSystem" (property 604c), and therefore also have an "AmericanCity" and a "NetworkAdapter." (properties 604b and 604e). An instance represented by the concept "NetworkAdapter" has an IP address represented by the concept "IPAddress."

Thus, knowledge assertion 600 represents a set of knowledge about the constituent concept 602 and instances 606 that allows for logical and inferential reasoning about the relationships between them.

Figure 7A:
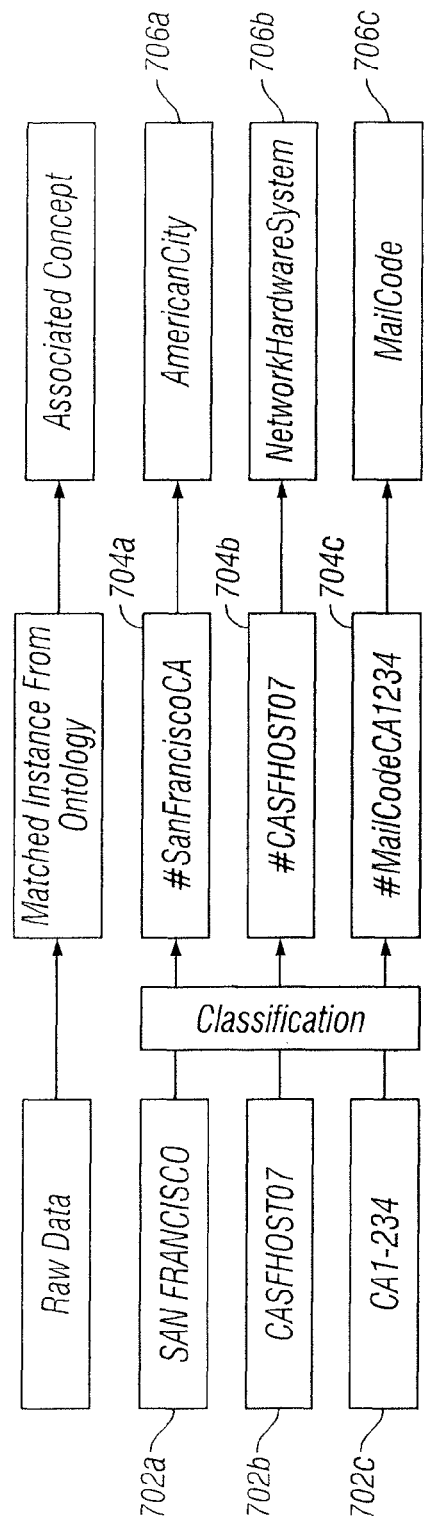
FIGS. 7A-7B illustrate an example of performing data mitigation, according to certain embodiments of the present disclosure.
Figure 7B:
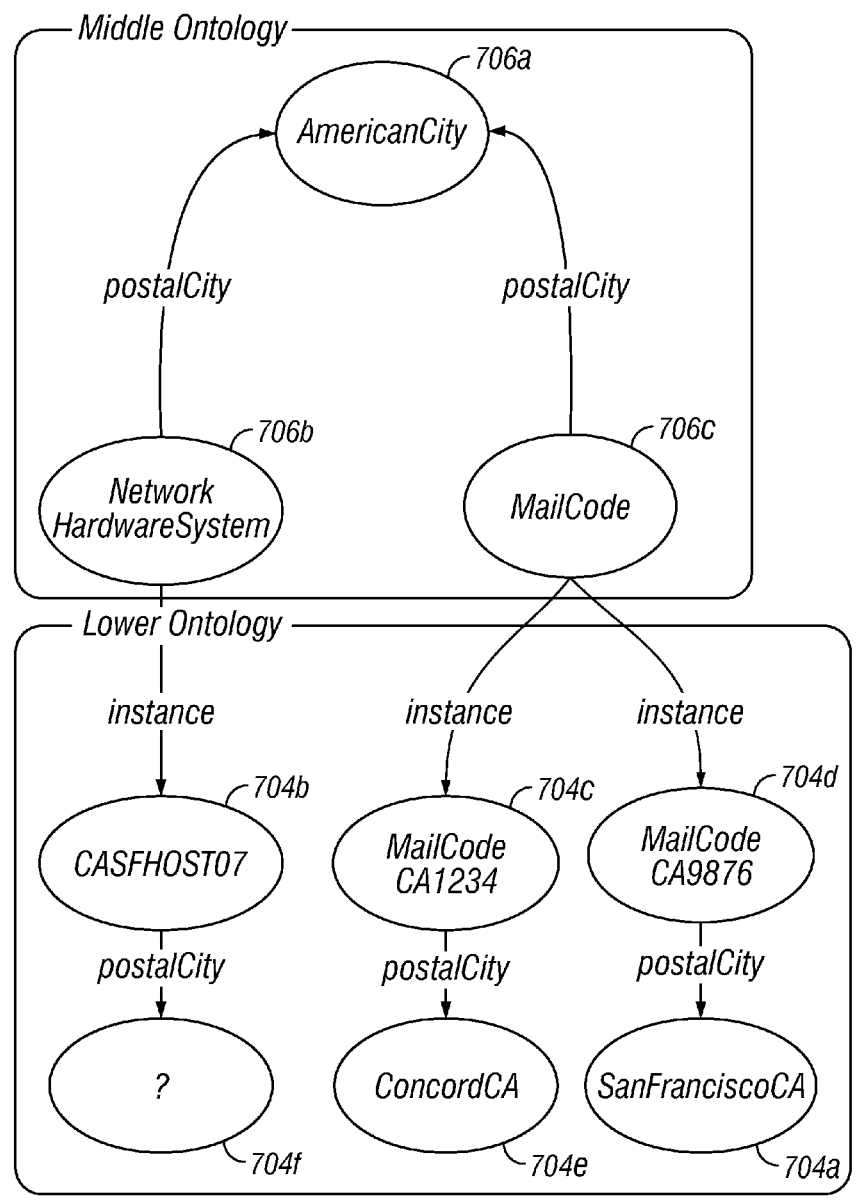

FIGS. 7A-7B illustrate an example of performing data mitigation, according to certain embodiments of the present disclosure. FIG. 7A illustrates example data retrieved from a data source, along with matched instances from ontology 162 and associated concepts from ontology 162 (e.g. as determined by data agent 152 and/or agent director 150). FIG. 7B illustrates the relationships between instances and concepts and their relationships to other data in ontology 162.

In FIG. 7A, 702a-c represent the raw data retrieved from the data source. In this example, the data source may be a machine configuration file for a particular computer, server, or other piece of networking hardware. The file contains the string "CASFHOST07," (raw data 702b) which data agent 152 parses and identifies as the name or identifier associated with the hardware device. Data agent 152 selects "NetworkHardwareSystem" (concept 706b) as the appropriate concept to represent this data. Data agent 152 matches the string to a known instance in ontology 162—"#CASFHOST07" (instance 704b).

The file also contains the string "SAN FRANCISCO," (raw data 702a) which data agent 152 parses and identifies as the city where the device is physically located. Data agent 152 selects "AmericanCity" (concept 706a) as the appropriate concept to represent this data. Agent director 150 matches the string to a known instance in ontology 162—"#SanFranciscoCA" (instance 704a).

The file also contains the string "CA1-234," (raw data 702c) which data agent 152 parses and identifies as a mail code associated with the device. Data agent 152 selects "MailCode" (concept 706c) as the appropriate concept to represent this data. Agent director 150 matches the string to a known instance in ontology 162—"#MailCodeCA1234" (instance 704c).

Agent director 150 is able to detect a conflict in this data and resolve it using data mitigation. Agent director 150 utilizes ontology 162 to do this. FIG. 7B shows how the concepts 706a-c and instance 704a-c relate to other knowledge in ontology 162. Based on ontology 162, agent director 150 determines that mailcodes may indirectly provide knowledge about a physical location such as a city. In particular, the concept "MailCode" (concept 706c) has a relationship to the concept "AmericanCity" (concept 706a) through the property "postalCity." The concept "NetworkHardwareSystem" (concept 706b) also has a relationship to the concept "AmericanCity" (concept 706a) through the property "postalCity." Therefore, if an instance of "NetworkHardwareSystem" relates to an instance of an "AmericanCity" and an instance of a "MailCode," those related instances must be logically equal or else agent director 150 will detect a conflict. In other words, the instance of "MailCode" should relate to the same instance of "AmericanCity" as does the instance of "NetworkHardwareSystem."

In this example, a conflict of this type exists. Instance "CASFHOST07" (704b) is linked to "SanFranciscoCA" (704a) and "MailCode1234" (704c). But "SanFranciscoCA" is linked to a different "MailCode"—"MailCode9876" (704d). And "MailCode1234" (704c) is linked to "ConcordCA" (704e), not "SanFraniscoCA" (704e). Therefore, it would be logically inconsistent to link instance "CASFHOST07" to both "SanFranciscoCA" and "MailCode1234." Data mitigation is performed by agent director 150 to choose between the competing knowledge.

Agent director 150 may use any of the methods described above in connection with FIGS. 3-4 to resolve the conflict. Agent director 150 may compute a quality score for each instance, based at least in part on statistical information stored in ontology 162. For example, agent director 150 may retrieve statistics associated with the data source from which the data was gathered, as well as statistics associated with the property "postalCity" for the concepts "MailCode" and "NetworkHardwareSystem." In this case, "SanFranciscoCA" may be assigned a higher quality score because it has a direct association in the data, whereas "ConcordCA" may be assigned a lower quality score because it has an indirect association in the data through the association with a "MailCode." Thus, "SanFranciscoCA" will be selected as the city to associate with "CASFHOST07." Agent director 150 will create a relationship between instance 704b and instance 804a through the property "postalCity." Agent director 150 may also associate metadata with "CASFHOST07" and/or its property "postalCity," including the computed quality score and/or information used to compute the score, so that the knowledge can be reevaluated if a later conflict arises. This might occur if, for example, another data source indicated that "CASFHOST07" in fact be linked to "ConcordCA" after all. If the quality score for that data ends up being higher (e.g. data comes from a more reliable or trustworthy data source), knowledge management engine 160 and/or agent director 150 may change the relationships in the ontology to reflect this knowledge.

Figure 8:
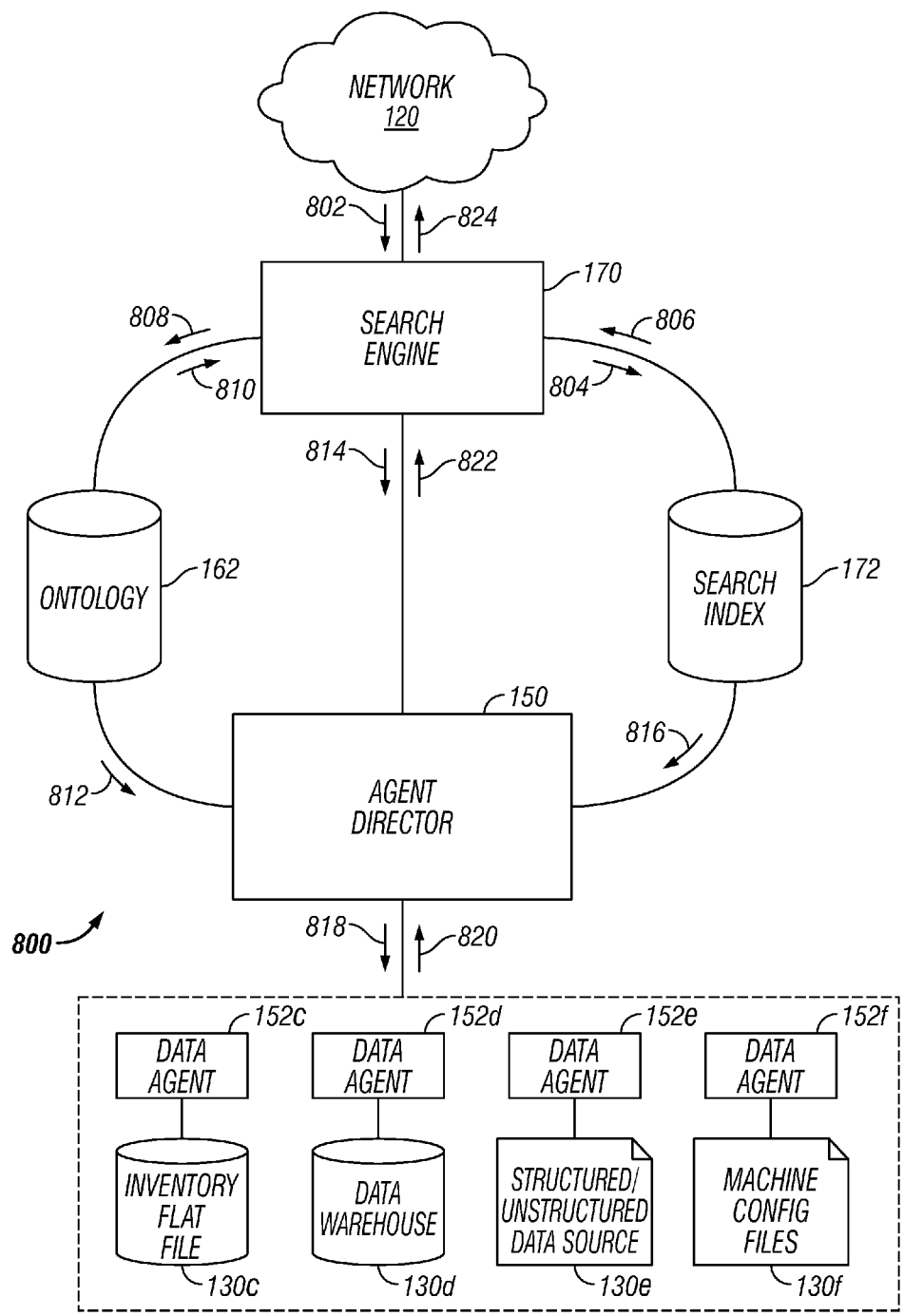
FIG. 8 illustrates an example system for knowledge searching, according to certain embodiments of the present disclosure.

FIG. 8 illustrates an example system 800 for knowledge searching, according to certain embodiments of the present disclosure. Search engine 170 may receive a search request 802 via network 120 (e.g., from user 142 via client 140). Search engine 170 may parse search request 802 to determine the type of search to be performed. Search engine 170 may be operable to perform at least three different types of searches: instance based searches, concept based searches, and details searches. Each type will be described in turn.

Instance Based Search

A instance based search may be a search where the request includes all or part of the name of certain instances in ontology 162. For example, a search request for "CAHOST0" might contain part of the name of instances "CAHOST01," "CAHOST02," and so on that might exist in ontology 162. Search engine 170 may convert search request 802 into query 804. Query 804 may be formatted using a concept query language that facilitates searching of search index 172 and/or ontology 162 and that takes into account the structure of ontology 162 (e.g. the use of concepts, instances, and properties). Search engine 170 submits query 804 to search index 172. Because search index 172 contains an index of instances in ontology 162, instances matching the search request can be identified without the need to query ontology 162. In certain embodiments, query 808 may be submitted to ontology 162 in parallel (i.e. the queries may be submitted before the search type is determined, and the search type may be determined after receiving the results and/or based on the results).

The query results 806 contain the matching instance or instances from search index 172. Search engine 170 may format the results into search listing 824. Search listing 824 may list all the matching instances (e.g. in a tabular format). Search listing 824 may also list the concept associated with each matching instance. For example, the listing for instance "CASFHOST07" may include the associated concept "L3-SWITCH." Search listing 824 may also include hyperlinks or buttons that allow the user to quickly get more information about the instances listed in the results. For example, each instance name may be presented as a hyperlink that, if followed by the user, will generate and submit a new search request 802 that requests additional details about that instance (e.g. a details search). As another example, each instance name may be presented along with a hyperlink that, if followed by the user, will generate and submit a visualization request to request a visual representation of how that instance relates to other data in ontology 162. Processing of visualization requests is discussed in more detail in connection with FIG. 10. Search listing 824 may be transmitted to user 142 for display on client 140 via GUI 144.

Concept Based Search

A concept based search may be a search where the request implicates relationships defined in ontology 162. For example, the search may correspond to an instance that is defined as a property of multiple instances. For example, a search request for "987" might correspond to an application number, which may be associated with a particular business application "BusinessAppA," as well as a number of servers that host, run, and/or access that business application—"ServerA," "ServerB," and "ServerC." Search index 172 may reflect all these instances, but may not capture their relationships, which are stored in ontology 162. Thus, search engine 170 may query ontology 162 to generate appropriate search results which capture the appropriate structuring of the search term against the associated instances.

Search engine 170 may convert search request 802 into query 804. Query 804 may be formatted using a concept query language that facilitates searching of search index 172 and/or ontology 162 and that takes into account the structure of ontology 162 (e.g. the use of concepts, instances, and properties). Search engine 170 submits query 804 to search index 172. Because search index 172 contains an index of instances in ontology 162, instances matching the search request can be identified and returned as query results 806. Query results 806 may be used to generate query 808. Query 808 may request related instances from ontology 162 based on the identified instances. For example, query 808 may request all instances related within one degree of the identified instance (e.g. a direct relationship exists between them). Search engine 170 submits query 808 to ontology 162 and receives in response query results 810, containing the related instances.

In certain embodiments, query 808 may be generated based on the search request without first querying search index 172. In certain embodiments, query 808 may be submitted to ontology 162 in parallel with query 804 being submitted to search index 172 (i.e. the queries may be submitted before the search type is determined, and the search type may be determined after receiving the results and/or based on the results).

The query results 810 may contain the instance that matches the search request, as well as certain other instances having a relationship with that instance in ontology 172. Search engine 170 may format the results into search listing 824. Search listing 824 may list all the returned instances (e.g. in a tabular format). Search listing 824 may also list the concept associated with each instance. For example, the listing for request "987" may include "BusinessAppA," as well as the associated concept "BUSINESS_APPLICATION," followed by "ServerA," "ServerB," and "ServerC," along with their associated concept "SERVER." Search listing 824 may also include hyperlinks or buttons that allow the user to quickly get more information about the instances listed in the results. For example, each instance name may be presented as a hyperlink that, if followed by the user, will generate and submit a new search request 802 that requests additional details about that instance (e.g. a details search). As another example, each instance name may be presented along with a hyperlink that, if followed by the user, will generate and submit a visualization request to request a visual representation of how that instance relates to other data in ontology 162. Processing of visualization requests is discussed in more detail in connection with FIG. 10. Search listing 824 may be transmitted to user 142 for display on client 140 via GUI 144.

Details Search

A details search may be a search that requests all available information about a particular instance and/or information about a particular instance that is not stored in ontology 162. For example, a search request may request details about server "CASFHOST07," such as the instance associated with each property of the server (hostname, IP address, subnet, etc.). In general, all available information about an instance may not be stored in search index 172 and/or ontology 162. However, metadata stored with the instance may provide information about where additional details can be found. Search engine 170 may utilize agent director 150 and/or data agents 152 to retrieve the requested data.

Search engine 170 may convert search request 802 into query 804. Query 804 may be formatted using a concept query language that facilitates searching of search index 172 and/or ontology 162 and that takes into account the structure of ontology 162 (e.g. the use of concepts, instances, and properties). Search engine 170 submits query 804 to search index 172. Because search index 172 contains an index of instances in ontology 162, the instance matching the details search request can be identified and returned as query results 806. In addition or alternatively, query results 806 may include metadata about the matching instance, including the data source(s) 130 that the instance was originally discovered in (e.g. by data agents 152). Query results 806 may be used to generate query 808. Query 808 may request data source information from ontology 162 for the identified data source(s) 130. Query 808 may also identify the matching instance. Search index 170 submits query 808 to ontology 162 and receives in response query results 810. Query results 810 may include information about each defined property in ontology 162 for the matching instance. Query results 810 may identify the instance related to each property. For properties where a relationship is defined, but a placeholder has been used rather than the actual instance data (either because the information was not known and was not stored in ontology 162), query results 810 may include the placeholder for that property. Query results 810 may also include metadata about the matching instance and/or the data source(s) identified by search index 172.

Search engine 170 may send retrieval request 818 to agent director 150. In some embodiments, agent director 150 may be initialized using data from ontology 162, such as concepts and/or concept statistics from the relevant domain in ontology 162. Retrieval request 818 may identify the data source(s) identified by search index 172. Retrieval request 818 may also include information about the properties for which information is needed (e.g. the properties that have placeholders rather than instance data).

Agent director 150 may utilize and coordinate data agents 152c-f to retrieve the requested data from the appropriate data source(s) 130 by sending instructions 818 to data agents 152. Agent director 150 may utilize one data agent 152 to retrieve data from each identified data source 130 (e.g. data agent 152d may retrieve information from data source 130d).

Data agents 152 may retrieve and process data from data sources 130, as described above in connection with FIGS. 3-5. Each enlisted data agent 152 may generate a knowledge assertion 820 and provide it to agent director 150. Agent director 150 may consolidate the knowledge assertions 820 into a single knowledge assertion 822. As part of that process, agent director 150 may perform data mitigation to resolve any conflicts within a knowledge assertion 820 and/or among different knowledge assertions 820, as described above in connection with FIGS. 3-4 and 7A-7B. Agent director 150 may provide the knowledge assertion 822 to search engine 170, which will include any information specified in retrieval request 814 that data agents 152 were able to locate in data sources 130.

Using the query results 810 received from ontology 162 and the knowledge assertion 822 received from agent director 150, search engine 170 may format the results into search listing 824. Search listing 824 may list all the properties of the instance for which details were requested (e.g. in a tabular format). For each property where information was found, either a related instance in ontology 162 or data retrieved by data agents 152, the information is included in the listing along with that property. Search listing 824 may also include hyperlinks or buttons that allow the user to quickly get more information about the instances listed with any given property. For example, each instance name may be presented as a hyperlink that, if followed by the user, will generate and submit a new search request 802 that requests additional details about that instance (e.g. a new details search). As another example, each instance name may be presented along with a hyperlink that, if followed by the user, will generate and submit a visualization request to request a visual representation of how that instance relates to other data in ontology 162. Processing of visualization requests is discussed in more detail in connection with FIG. 10. Search listing 824 may be transmitted to user 142 for display on client 140 via GUI 144.

In some embodiments, if the identified instance is a server, switch, or other computing or hardware device connected to a network, search listing 824 may also include a list of other devices instances that are known to be connected to that identified device instance based on ontology 162 (e.g. other devices in the same subnet). These instances may be presented as a hyperlink that, if followed by the user, will generate and submit a new search request 802 that requests additional details about that instance and/or a visualization request including that instance.

Figure 9:
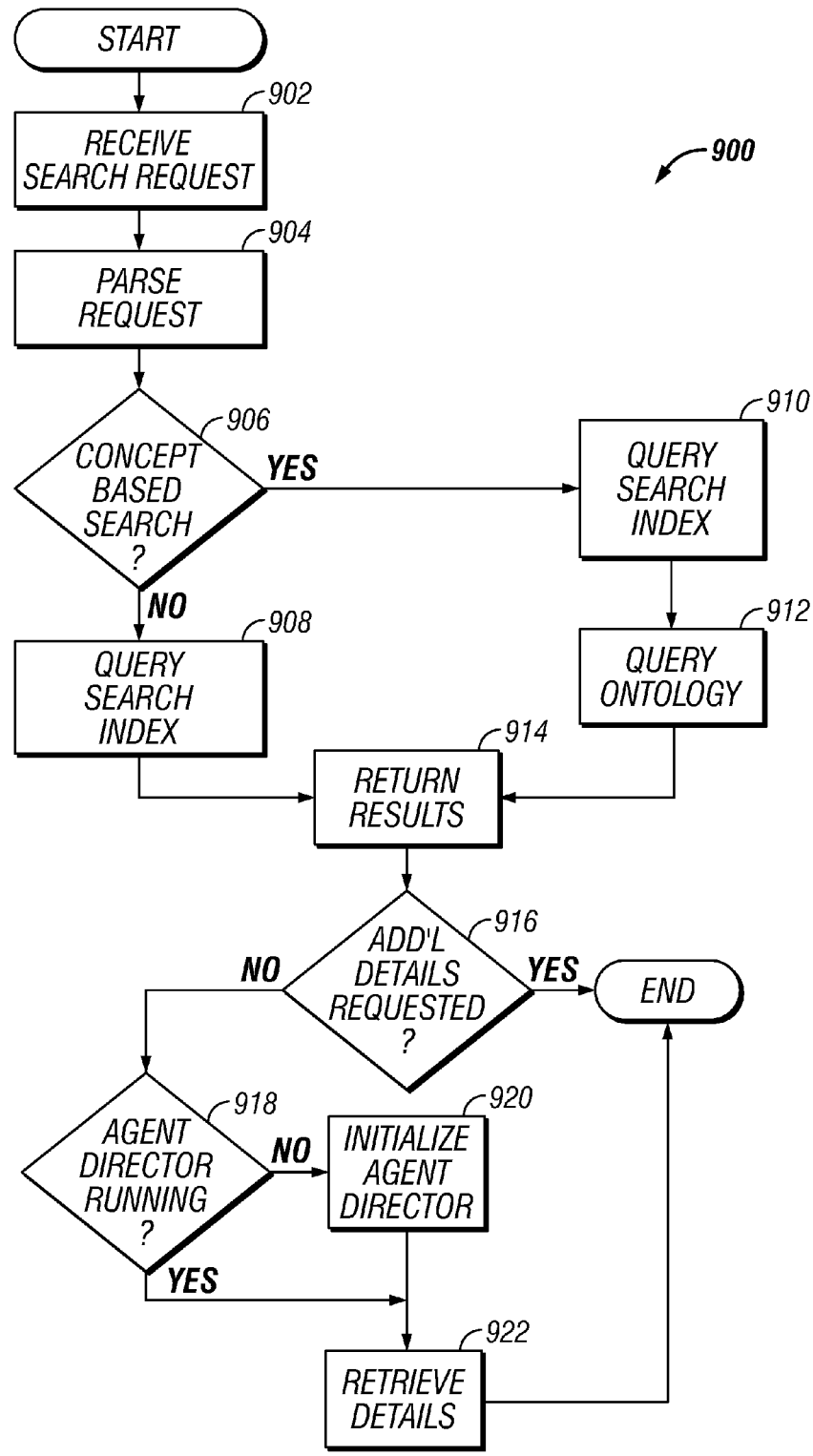
FIG. 9 illustrates an example method for knowledge searching, according to certain embodiments of the present disclosure.

FIG. 9 illustrates an example method 900 for knowledge searching, according to certain embodiments of the present disclosure. At step 902, search engine 170 receives a search request (e.g., from user 142 via client 140). At step 904, search engine 170 may parse the search request to formulate a search query and/or to determine the type of search to be performed. Search engine 170 may be operable to perform at least three different types of searches: instance based searches, concept based searches, and details searches.

At step 906, search engine 170 determines whether the user is performing a concept based search. If so, the method proceeds to step 910. If the user is performing an instance based search, the method proceeds to step 908.

At step 908, search engine 170 submits a query to search index 172. Because search index 172 contains an index of instances in ontology 162, instances matching the user's search request can be identified without the need to query ontology 162. The query results contain the matching instance or instances from search index 172. The method then proceeds to step 914.

At step 910, search engine 170 submits a query to search index 172. Because search index 172 contains an index of instances in ontology 162, instances matching the search request can be identified and returned as query results. At step 912, those query results may be used to generate a second query, which may be submitted to ontology 162. The second query may request related instances from ontology 162 based on the identified instances. For example, the second query may request all instances related within one degree of the identified instance (e.g. a direct relationship exists between them). Search engine 170 submits the second query to ontology 162 and receives in response query results containing the related instances. The query results may contain the instance that matches the search request, as well as certain other instances having a relationship with that instance in ontology 172.

At step 914, search engine 170 may format the results into a search listing. The search listing may list all the instances returned from search index 172 and/or ontology 162 (e.g. in a tabular format). The search listing may also list the concept associated with each instance. The search listing may also include hyperlinks or buttons that allow the user to quickly get more information about the instances listed in the results. For example, each instance name may be presented as a hyperlink that, if followed by the user, will generate and submit a new search request that requests additional details about that instance (e.g. a details search). The search listing may be transmitted to user 142 for display on client 140 via GUI 144.

At step 916, search engine 170 determines whether additional details have been requested regarding one or more of the items in the search listing. For example, search engine 170 may determine whether a user clicked on a hyperlink or button in the search results to request more information about one of the instances in the search listing. If no additional details have been requested, the method ends. If details are requested, the method proceeds to step 918.

At step 918, search engine 170 determines whether agent director 150 is already running and/or initialized (e.g. is ready to retrieve the requested data). If not, the method proceeds to step 920, where agent director 150 is initialized. Agent director 150 may be initialized using data from ontology 162, such as concepts and/or concept statistics from the relevant domain in ontology 162. If the agent director 150 is already running, the methods proceeds to step 922.

At step 922, search engine 170 retrieves all known information about the selected items in the search listing from ontology 172. Search engine 170 may identify any missing or placeholder data in ontology 172 and delegate to agent director 150 to retrieve that data from relevant data sources identified in search index 172. Agent director 150 utilizes one or more data agents 152 to retrieve and process data from the identified data sources in order to assemble a knowledge assertion containing as much of the requested data as possible. Using the results received from ontology 162 and the knowledge assertion received from agent director 150, search engine 170 may format the results into a search listing. Search listing 824 may list all the properties of the instance for which details were requested (e.g. in a tabular format). For each property where information was found, either a related instance in ontology 162 or data retrieved by data agents 152, the information is included in the listing along with that property. Search listing 824 may be transmitted to user 142 for display on client 140 via GUI 144. The method then ends.

Figure 10:
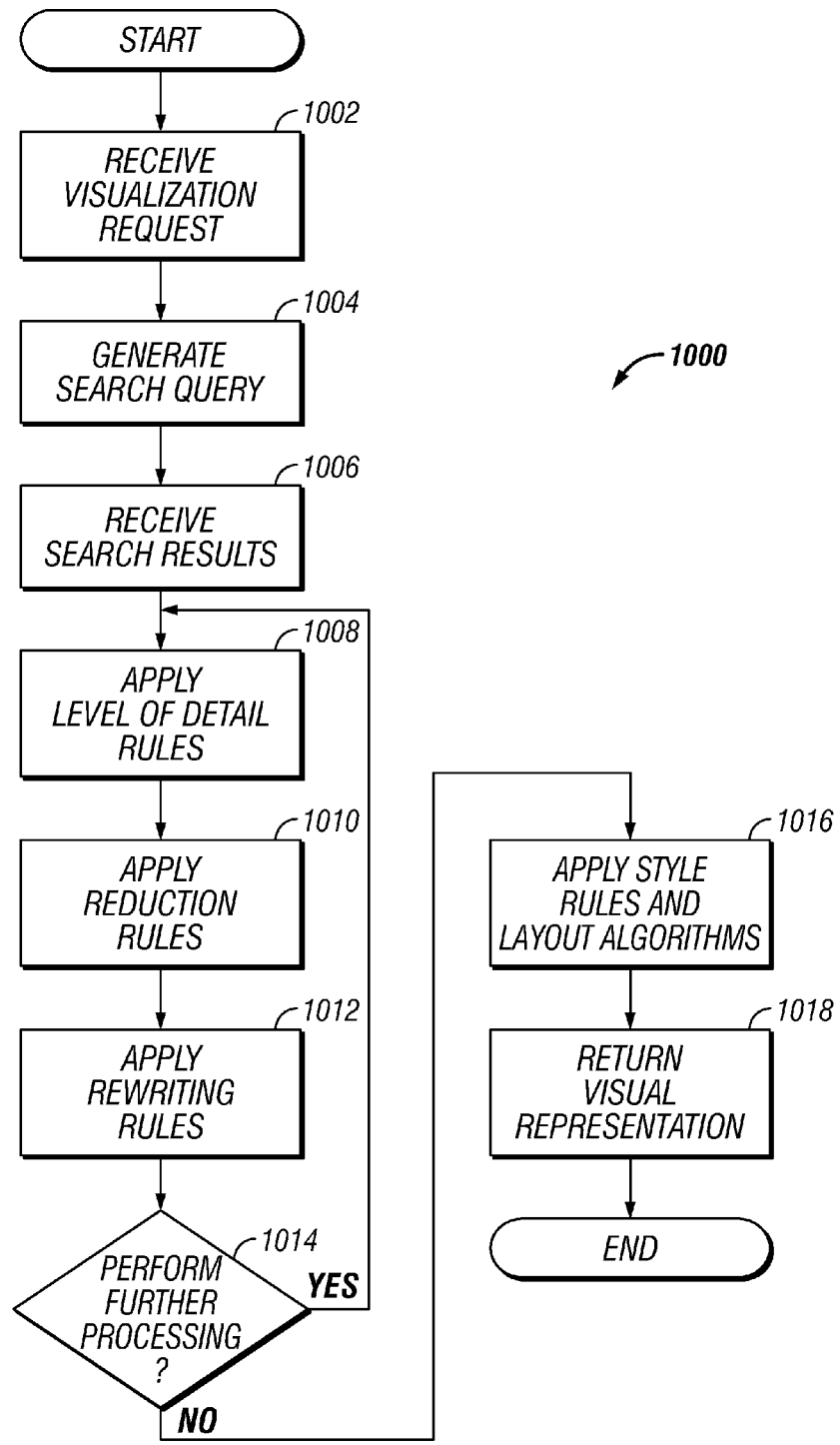
FIG. 10 illustrates an example method for knowledge visualization, according to certain embodiments of the present disclosure.

FIG. 10 illustrates an example method 1000 for knowledge visualization, according to certain embodiments of the present disclosure. At step 1002, visualization engine 180 may receive a visualization request (e.g., from user 142 via client 140). The visualization request may specify a starting concept or instance in ontology 162. In general, visualization engine will create a visual representation of the relationships the starting concept or instance has with other concepts and/or instances in ontology 162, as well as the relationships between those concepts and/or instances and other concepts and/or instances, and so on.

At step 1004, visualization engine 180 may parse the visualization request to generate a search query. The search query may be formatted using a concept query language that facilitates searching of search index 172 and/or ontology 162 and that takes into account the structure of ontology 162 (e.g. the use of concepts, instances, and properties). The search query may identify the starting concept or instance. In generating the search query, visualization engine 180 may apply visualization rules to limit and/or reduce the scope and/or volume of search results that may be returned from the query. This may contribute to producing a more manageable and/or user-friendly visual representation. For example, the query may include a relationship depth that can be used to limit the number of relationships search engine 170 should traverse from the starting concept and/or instance in providing results. The relationship depth may be determined based on the starting concept or instance selected. Visualization engine 180 may submit the search query to search engine 170.

At step 1006, visualization engine 180 receives search results. The search results may include any number of concepts, instances, properties, and/or relationships between the concepts and instances (through the properties). In certain embodiments, the search results may be a knowledge assertion. In certain embodiments, visualization engine 180 may convert the knowledge assertion to a concept network by removing the properties and/or collapsing the properties into their associated relationships.

At step 1008, level of detail rules are applied to the search results. Level of detail rules may be used to remove details from the search results (e.g. by performing vertex reduction and/or edge culling.) Level of detail rules may allow instances, concepts, and/or relationships to be removed from the search results without replacement. For example, visualization engine 180 may select a relationship and remove it from the search results. If this deletion results in a concept or instance having no relationships to any other concept or instances, that concept or instance may be removed from the search results. For example, given search results that represent the network topology of a computer data center, all instances of data representing server connections could be removed so that only the main physical network infrastructure is shown to the user.

In certain embodiments, the number of instances, concepts, and/or relationships to be removed may be determined based on user input, and/or may be adaptively determined based on the data in the search results. Regarding user input, a user may specify a requested level of detail, for example, using a slider on GUI 144 and/or by using a zoom control. If the user zooms in, reducing the scope of the results, visualization engine 180 may increase the permitted level of detail. Conversely, if the users zooms out, increase the scope of the results, visualization engine 180 may decrease the permitted level of detail. Regarding adaptive determination, visualization engine may evaluate the scope and/or level of noise in the search results. This may be quantified, for example, based on the number of concepts and/or instances in the result, based on the number of relationship links in the results, based on the average number of relationships connected to each concept and/or instance, and/or any other suitable metrics.

At step 1010, reduction rules are applied to the search results. Reduction rules may be used to generalize fine grain details represented in the search results into a more abstract representation. Reduction rules may allow two or more instances and/or concepts to be removed from the search results and replaced with a single instance and/or concept. Relationships to each of the two or more removed items would become relationships with the replacement item. For example, an instance of concept A and an instance of concept B may be replaced with an instance of a concept C, which is a union of concept A and B. As another example, given a search result that represents the network topology of a computer data center, a reduction rule could identify a pair of primary and secondary (failover) networking hardware devices and reduce them to a single instance of a load-balanced pair. In either example, the number of concepts/instances would be reduced by half while still conceptually representing the same information to the user.

At step 1012, rewriting rules are applied to the search results. Rewriting rules may be used to replace one concept or instance with another concept or instance. In some embodiments, the replacement concept/instance may be more generalized than the original concept/instance. For example, an instance representing the concept "BrandX Server" could be replaced with the more generic concept "Server." This might allow for further simplification using other visualization rules, such as allowing the replacement concept to be combined with another concept using reduction rules.

At step 1014, visualization engine 180 determines if further processing should be performed on the search results. Iterative processing using the visualization rules may increase the readability of the resulting visualization. Therefore, further processing may be performed if any removals or replacements occurred at steps 1008, 1010, or 1012. Those removals may allow for further removals or replacements if the visualization rules are applied to the modified set of data. In some embodiments, the determination of whether to perform further processing may be based on whether a desired level of detail has been achieved or if further reductions are necessary. If further processing is needed, the method returns to step 1008. If not, the method proceeds to step 1016.

At step 1016, visualization engine 180 applies style rules and layout algorithms to the processed search results to produce a visual representation of the concepts, instances, and the relationships between them. Style rules and layout algorithms may specify how the results should be visually arranged according to achieve desired aesthetic qualities. For example, each instance/concept may be represented by a shape of a particular size and/or color and relationships between them may be represented by lines of particular thicknesses. As another example, the instances/concepts may be arranged so as to minimize or eliminate line crossings and/or to ensure that lines cross at particular angles. As another example, properties associated with each relationship may be displayed along with the line representing the relationship, or inside the shape representing the concept/instance. Any suitable aesthetic guidelines may be employed, according to particular needs.

At step 1018, the resulting visual representation is transmitted to user 142 for display on client 140 via GUI 144. In some embodiments, each concept and/or instance represented in the visual representation may include a hyperlink that, if clicked by the user, will submit a details search request to search engine 170. This may allow user 142 to view details of the objects represented in the visual representation (e.g. in a pop-up window). The method then ends.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a memory operable to store one or more classification rules; and
a processor communicatively coupled to the memory and operable to:
retrieve one or more data elements from a data source;
identify a structured data element among the one or more data elements;
parse the structured data element using one or more filter processes to produce a plurality of tokens;
classify the plurality of tokens based at least in part on the one or more classification rules and an ontology, the ontology comprising a plurality of concepts and a plurality of relationships between the concepts;
identify a conflict between a first classified token and a second classified token;
resolve the conflict by evaluating the first and second classified tokens based at least in part on the ontology; and
generate a knowledge assertion comprising the plurality of classified tokens and one or more relationships between the classified tokens.

2. The system of claim 1, wherein:
the ontology further comprises concept statistics associated with the plurality of concepts; and
the processor is further operable to resolve the conflict by evaluating the first and second classified tokens based at least in part on the concept statistics.

3. The system of claim 1, wherein the processor is further operable to:
generate data source statistics for the data source; and
retrieve one or more updated data elements from the data source according to an update schedule, the update schedule based at least in part on the data source statistics.

4. The system of claim 1, wherein the processor is further operable to:
identify an unstructured data element among the one or more data elements;
parse the unstructured data element to produce a second plurality of tokens; and
return the second plurality of tokens and source information for inclusion in a search index.

5. The system of claim 4 wherein the source information comprises one or more of:
a pointer to the data source; and
a pointer to the unstructured data element.

6. The system of claim 1 wherein the processor is further operable to:
receive a query comprising a particular classified token; and
generate a result comprising:
one or more additional classified tokens generated based on information retrieved from the data source; and
one or more relationships between the additional classified tokens, wherein each additional classified token has at least one relationship with the particular classified token.

7. A method, comprising:
retrieving one or more data elements from a data source;
identifying a structured data element among the one or more data elements;
parsing the structured data element using one or more filter processes to produce a plurality of tokens;
classifying, by a processor, the plurality of tokens based at least in part on one or more classification rules and an ontology, the ontology comprising a plurality of concepts and a plurality of relationships between the concepts;
identifying a conflict between a first classified token and a second classified token;
resolving the conflict by evaluating the first and second classified tokens based at least in part on the ontology; and
generating a knowledge assertion comprising the plurality of classified tokens and one or more relationships between the classified tokens.

8. The method of claim 7, wherein:
the ontology further comprises concept statistics associated with the plurality of concepts; and
resolving the conflict by evaluating the first and second classified tokens is based at least in part on the concept statistics.

9. The method of claim 8, further comprising:
generating data source statistics for the data source; and
retrieving one or more updated data elements from the data source according to an update schedule, the update schedule based at least in part on the data source statistics.

10. The method of claim 7, further comprising:
identifying an unstructured data element among the one or more data elements;
parsing the unstructured data element to produce a second plurality of tokens; and
returning the second plurality of tokens and source information for inclusion in a search index.

11. The method of claim 10, wherein the source information comprises one or more of:
a pointer to the data source; and
a pointer to the unstructured data element.

12. The method of claim 7, further comprising:
receiving a query comprising a particular classified token; and
generating a result comprising:
one or more additional classified tokens generated based on information retrieved from the data source; and
one or more relationships between the additional classified tokens, wherein each additional classified token has at least one relationship with the particular classified token.

13. One or more non-transitory computer readable storage media embodying logic that is operable when executed by one or more processors to:
retrieve one or more data elements from a data source;
identify a structured data element among the one or more data elements;
parse the structured data element using one or more filter processes to produce a plurality of tokens;
classify the plurality of tokens based at least in part on one or more classification rules and an ontology, the ontology comprising a plurality of concepts and a plurality of relationships between the concepts;
identify a conflict between a first classified token and a second classified token;
resolve the conflict by evaluating the first and second classified tokens based at least in part on the ontology; and
generate a knowledge assertion comprising the plurality of classified tokens and one or more relationships between the classified tokens.

14. The storage media of claim 13, wherein:
the ontology further comprises concept statistics associated with the plurality of concepts; and the logic is further operable when executed to resolve the conflict by evaluating the first and second classified tokens based at least in part on the concept statistics.

15. The storage media of claim 13, wherein the logic is further operable when executed to:
   generate data source statistics for the data source; and
   retrieve one or more updated data elements from the data source according to an update schedule, the update schedule based at least in part on the data source statistics.

16. The storage media of claim 13, wherein the logic is further operable when executed to:
   identify an unstructured data element among the one or more data elements;
   parse the unstructured data element to produce a second plurality of tokens; and
   return the second plurality of tokens and source information for inclusion in a search index.

17. The storage media of claim 16, wherein the source information comprises one or more of:
   a pointer to the data source; and
   a pointer to the unstructured data element.

18. The storage media of claim 13, wherein the logic is further operable when executed to:
   receive a query comprising a particular classified token; and
   generate a result comprising:
      one or more additional classified tokens generated based on information retrieved from the data source; and
      one or more relationships between the additional classified tokens, wherein each additional classified token has at least one relationship with the particular classified token.

* * * * *